United States Patent [19]
Kane

[11] Patent Number: 6,054,194
[45] Date of Patent: Apr. 25, 2000

[54] MATHEMATICALLY OPTIMIZED FAMILY OF ULTRA LOW DISTORTION BELLOW FOLD PATTERNS

[76] Inventor: Nathan R. Kane, 78 Powderhouse Blvd., Somerville, Mass. 02144

[21] Appl. No.: 08/798,064

[22] Filed: Feb. 11, 1997

[51] Int. Cl.[7] ........................................................ B32B 3/28
[52] U.S. Cl. .............................. 428/12; 428/181; 105/18; D23/384
[58] Field of Search ..................................... 428/174, 130, 428/181, 121; 105/15, 18, 19, 20; 280/401, 403; 446/487, 488; D23/384

[56] References Cited

U.S. PATENT DOCUMENTS

| | | | |
|---|---|---|---|
| 3,967,023 | 6/1976 | Lysek | 428/174 |
| 5,008,140 | 4/1991 | Schmertz | 428/179 |
| 5,234,727 | 8/1993 | Hoberman | 428/12 |
| 5,471,934 | 12/1995 | Koch | 105/18 |

*Primary Examiner*—Donald Loney

[57] ABSTRACT

An improved mathematically modeled family of bellow fold patterns, useful for making bellows from stiff but foldable materials, which forms a corner of a bellow consisting of a series of several single inversion fold patterns, each having a characteristic design angle which is mathematically computed to provide a desired initial wall angle for the bellow and to minimize wall tilting over a predetermined extension angle range, thereby allowing low cost bellows to be made which can extend long distances while using a minimal amount of stiff but foldable material. In addition, each characteristic design angle can be computed to provide exactly zero tilting of the bellow walls at one or more non-zero extension lengths specified by a designer, thus allowing, unlike all other prior art folds, a structurally stiff, long extending bellow to be formed in an extended state using fast production techniques such as vacuum forming, blow molding or injection molding, while also allowing the bellow to be free of distortion in the compressed state.

6 Claims, 13 Drawing Sheets

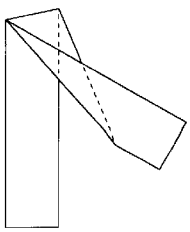 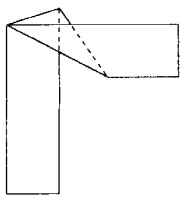 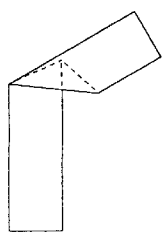 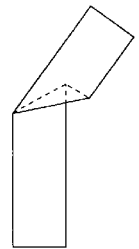
Fig. 9a  Fig. 9b  Fig. 9c  Fig. 9d
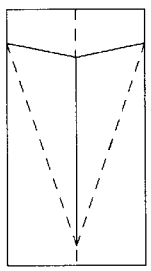 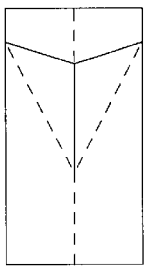 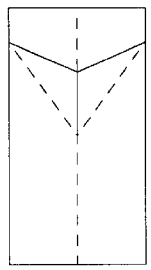 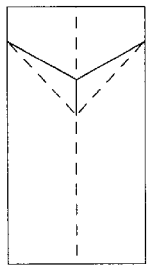
Fig. 9e  Fig. 9f  Fig. 9g  Fig. 9h
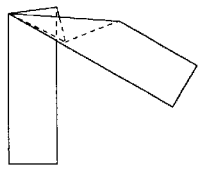 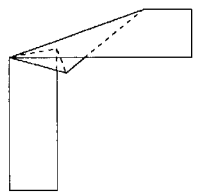 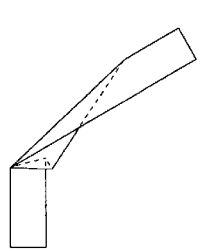 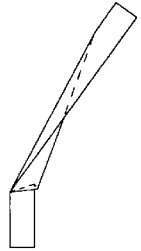
Fig. 10a  Fig. 10b  Fig. 10c  Fig. 10d
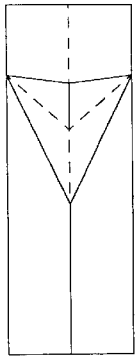 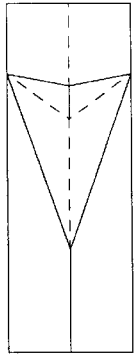 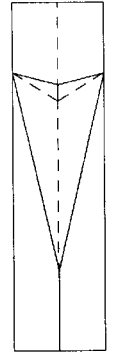 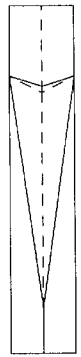
Fig. 10e  Fig. 10f  Fig. 10g  Fig. 10h

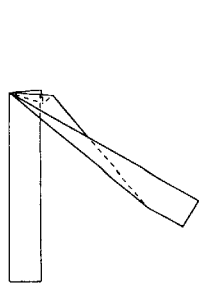
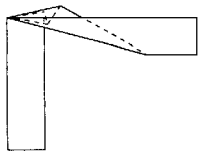
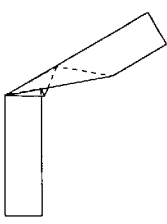
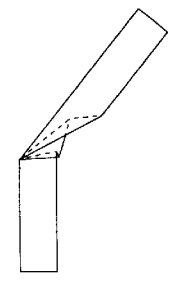
Fig. 11a          Fig. 11b          Fig. 11c          Fig. 11d
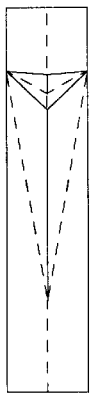
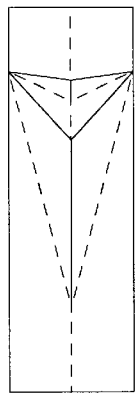
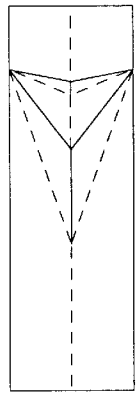
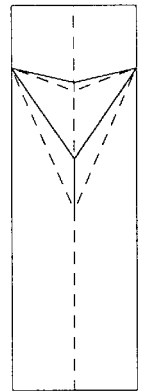
Fig. 11e          Fig. 11f          Fig. 11g          Fig. 11h
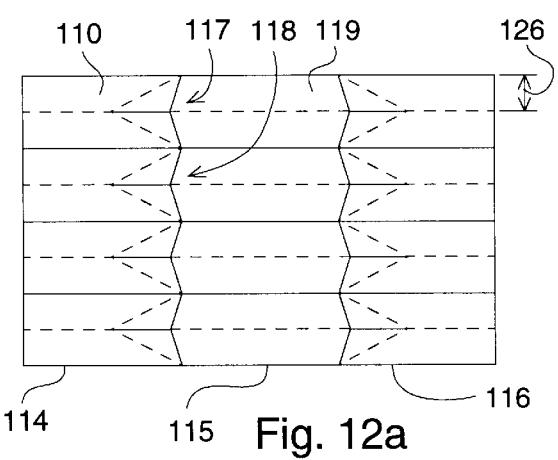
Fig. 12a
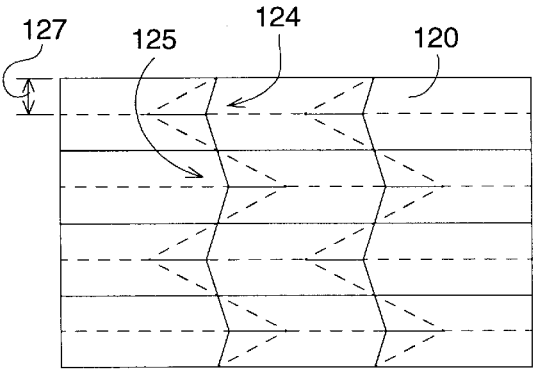
Fig. 13a
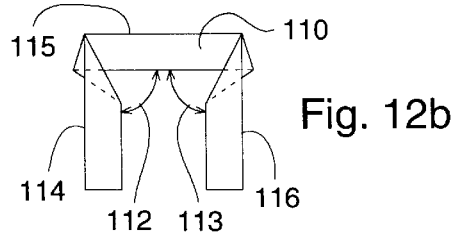
Fig. 12b
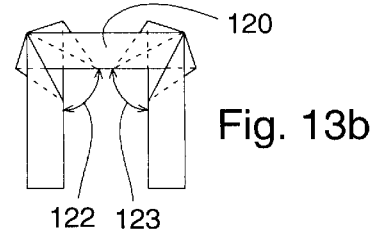
Fig. 13b

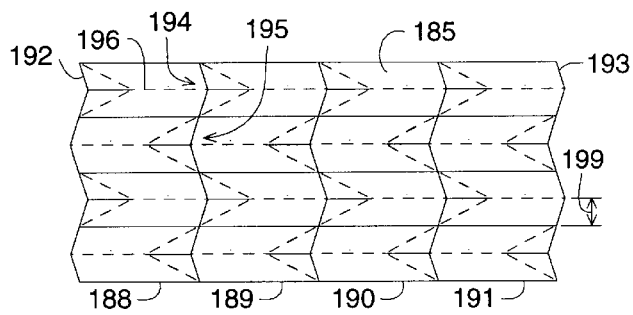
Fig. 18a
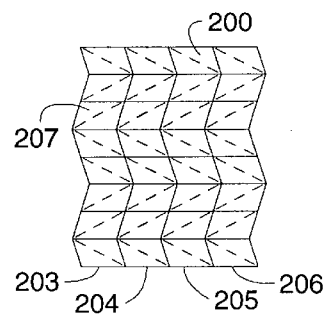
Fig. 19a
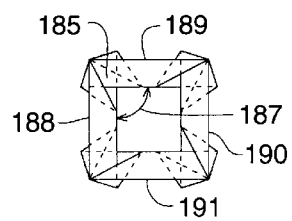
Fig. 18b
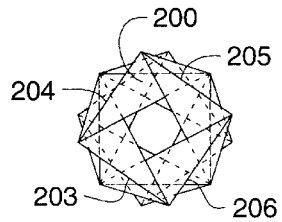
Fig. 19b
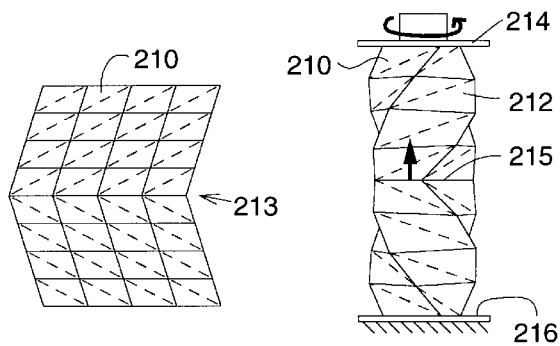
Fig. 20a
Fig. 20c
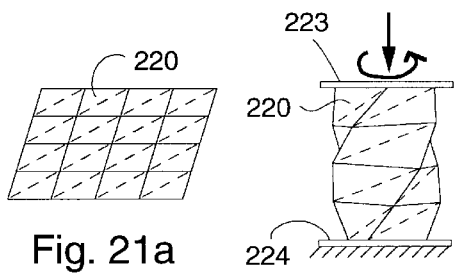
Fig. 21a
Fig. 21c
Fig. 20b
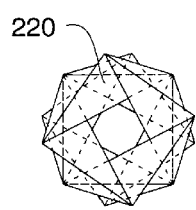
Fig. 21b

MATHEMATICALLY OPTIMIZED FAMILY OF ULTRA LOW DISTORTION BELLOW FOLD PATTERNS

The present invention is an improved mathematically modeled family of bellow fold patterns for forming the corner of a bellow which impose minimal tilting of the bellow walls over long extension lengths, thereby allowing low cost bellows to be made which can extend long distances and which use a minimal amount of material.

BACKGROUND

Bellows of various types are used in a wide variety of industrial machines and products. Bellows which have a closed cross section are used for such applications as protecting shock absorbers, lead screws, hydraulic rods, and various other machine parts from contaminants, and for conveying or pumping gases or fluids. Bellows which have an open cross section are commonly used for protecting linear ways in machine tools and similar components of industrial machinery. Prior art bellow designs can be classified into three categories: the folded bellow, which is made by forming discrete fold lines into a tube or sheet of foldable material; the corrugated bellow, which is made by permanently stretching the material significantly to form an undulating surface onto a tube or a sheet; and the layered bellow, which is made by selectively bonding the edges of a stack of sheets.

Folded bellow designs, to which the present invention specifically relates, are used widely in industry because they have a high extended length to compressed length ratio, and they are relatively easy to custom fabricate. Prior art fold patterns which are used for folded bellows by companies today are very traditional and have been used for centuries. A useful reference which shows the two main traditional prior art fold patterns is "Materials for Bellows Type Protective Devices" by E. A. Annenberg, E. A. Maiorova, I. M. Sokhor, in Machines and Tooling, v 33, n 11, 1962 p. 39–42. In that reference, FIG. 2 and FIG. 3 show two classic fold patterns used for forming the corners of bellows. For the sake of discussion, these fold patterns, which form the corner of a bellow, will be given names. In FIG. 3 of Annenberg et. al, each V-shaped fold pattern, which forms the corner of a bellow, will be referred to as a single inversion. In FIG. 2 of Annenberg et. al, each V-shaped fold pattern that has an additional fold connecting the wings of the V will be referred to as a classic double inversion. Single inversions and classic double inversions are widely used to form the corners of bellows in industry. Also in Annenberg et. al, FIG. 4 shows an unusual double inversion pattern which is particularly used for a hexagonal closed cross section bellow, proposed by the Russian designer Pavchinskii. Since the Pavchinskii design cannot have an arbitrary cross section, it is not used in industry.

A deficiency of single inversions and classic double inversions commonly used in industry are that when they are extended, they impose outward tilting, or inward tilting, respectively, on the bellow walls. To prevent this undesirable wall tilting when the bellow is extended, shape holding frames are used which are sewn in between adjacent folds, and floppy rubberized fabrics are used to allow the fold lines to undergo gross distortions. Using either single inversions or classic double inversions, the design paradigm has been to use shape holding frames to provide the structural rigidity, and floppy rubberized fabrics to allow gross distortions of the bellow fold lines when the bellow is extended. This prior art design paradigm means that an expensive multi-step assembly process must be used to make the bellow and expensive rubberized fabrics must be used for the folded material.

As stated earlier, all major bellow manufacturers which make protective covers use either single inversions or classic double inversions to form the corners of bellows. As a result, bellow manufacturers of today are forced to use the costly design paradigm for bellows discussed earlier. For example, in the Design Handbook provided by Milwaukee Protective Covers—P.E.I., Milwaukee, Wis., several way cover bellows are shown which use a classic double inversion to form the bellow corners. Page 5 of the handbook shows several PVC stiffening panels which are welded between each fold of a special flexible material. In the Product Guide supplied by Protect & Hema, L.L.C., Loves Park, Ill., on page 15 is shown the underside of a bellow that uses a classic double inversion, which has a complex assembly of stiffening panels and straps to prevent the bellow from overextending. These extra parts are needed because the folded material itself is too floppy to give the bellow support. On pages 17 and 18 are shown bellows that use single inversions to form the bellow corners and plastic stiffening panels glued underneath each bellow panel. In another example, a product flyer provided by A&A Mfg. Co., Inc. of New Berlin, WI entitled "Gortite® Linear Rail Covers" shows several way covers which use classic double inversions to form the bellow corners with stiffening panels at each fold. Another manufacturer, Centryco® of Burlington N.J., in their flyer entitled "Centryco Bellows Selection & Design Guide" shows some closed cross section bellows which use classic double inversions to form the bellow corners with stiffening panels sewn in at each fold.

Another relevant area of prior art is passage protection devices for articulated buses or trains. In U.S. Pat. No. 5,471,934, a novel tongue and groove fold is shown to form the corner of a bellow which can provide long extension lengths. While the geometry of this fold is different than either the single inversion or the classic double inversion, it still requires a flexible fabric to be used, and stiffening frames to be attached on either side of the fold. Therefore, this fold does not change the design paradigm described for bellows and hence is costly and complex.

OBJECTS OF THE INVENTION

An object of the present invention, accordingly, is to provide an improved family of fold patterns for forming the corner of a bellow which when folded into a stiff but foldable material, for which the folds act like hinges and the bellow panels remain rigid, can be designed using a mathematical model to provide minimal tilting of bellow walls over a specified extension angle range, thus allowing, unlike all other prior art folds, a structurally stiff, long extending bellow which holds its own shape to be made from a single sheet of stiff but foldable material.

A further object is to provide an improved family of fold patterns for forming the corner of a bellow which can be designed using a mathematical model to provide exactly zero tilting of the bellow walls at one or more non-zero extension lengths specified by a designer, thus allowing, unlike all other prior art folds, a structurally stiff, long extending bellow to be formed in an extended state using fast production techniques such as vacuum forming, blow molding, or injection molding, while also allowing the bellow to be free of distortion in the compressed state.

A further object is to provide an improved family of fold patterns which when incorporated into a bellow that does have shape holding frames, greatly reduces the material stress and distortion along the fold lines when the bellow is extended, thereby allowing the bellow to be compressed and extended with less force, allowing longer extension lengths, longer fatigue life, and allowing a designer to use a greater variety of stiff but foldable plastics for bellow designs, as opposed to prior art folds which restrict a designer to using only floppy materials such as fabrics and rubber sheets.

A further object is to provide an improved family of fold patterns for forming the corner of a bellow which when properly designed and optimized using a mathematical model, can provide a bellow with two or more elastically stable states; the first state being near full collapse, and the other states being near full extension, thereby providing a novel collapsible, expandable conduit or container.

Other and further objects will be explained hereinafter and are more fully delineated in the appended claims.

DRAWINGS

The present invention will now be described with reference to the accompanying drawing in which:

FIG. 9a shows a plan view of a double inversion fold pattern with design angles that yield a 60 degree initial wall angle and minimal wall angle change up to an extension angle limit of 120 degrees;

FIG. 9b shows a plan view of a double inversion fold pattern with design angles that yield a 90 degree initial wall angle and minimal wall angle change up to an extension angle limit of 120 degrees;

FIG. 9c shows a plan view of a double inversion fold pattern with design angles that yield a 120 degree initial wall angle and minimal wall angle change up to an extension angle limit of 120 degrees;

FIG. 9d shows a plan view of a double inversion fold pattern with design angles that yield a 144 degree initial wall angle and minimal wall angle change up to an extension angle limit of 120 degrees;

FIG. 9e shows a folded view of the fold pattern shown in FIG. 9a;

FIG. 9f shows a folded view of the fold pattern shown in FIG. 9b;

FIG. 9g shows a folded view of the fold pattern shown in FIG. 9c;

FIG. 9h shows a folded view of the fold pattern shown in FIG. 9d;

FIG. 10a shows a plan view of a triple inversion fold pattern with design angles that yield a 60 degree initial wall angle and minimal wall angle change up to an extension angle limit of 120 degrees;

FIG. 10b shows a plan view of a triple inversion fold pattern with design angles that yield a 90 degree initial wall angle and minimal wall angle change up to an extension angle limit of 120 degrees;

FIG. 10c shows a plan view of a triple inversion fold pattern with design angles that yield a 120 degree initial wall angle and minimal wall angle change up to an extension angle limit of 120 degrees;

FIG. 10d shows a plan view of a triple inversion fold pattern with design angles that yield a 144 degree initial wall angle and minimal wall angle change up to an extension angle limit of 120 degrees;

FIG. 10e shows a folded view of the fold pattern shown in FIG. 10a;

FIG. 10f shows a folded view of the fold pattern shown in FIG. 10b;

FIG. 10g shows a folded view of the fold pattern shown in FIG. 10c;

FIG. 10h shows a folded view of the fold pattern shown in FIG. 10d;

FIG. 11a shows a plan view of a quadruple inversion fold pattern with design angles that yield a 60 degree initial wall angle and minimal wall angle change up to an extension angle limit of 120 degrees;

FIG. 11b shows a plan view of a quadruple inversion fold pattern with design angles that yield a 90 degree initial wall angle and minimal wall angle change up to an extension angle limit of 120 degrees;

FIG. 11c shows a plan view of a quadruple inversion fold pattern with design angles that yield a 120 degree initial wall angle and minimal wall angle change up to an extension angle limit of 120 degrees;

FIG. 11d shows a plan view of a quadruple inversion fold pattern with design angles that yield a 144 degree initial wall angle and minimal wall angle change up to an extension angle limit of 120 degrees;

FIG. 11e shows a folded view of the fold pattern shown in FIG. 11a;

FIG. 11f shows a folded view of the fold pattern shown in FIG. 11b;

FIG. 11g shows a folded view of the fold pattern shown in FIG. 11c;

FIG. 11h shows a folded view of the fold pattern shown in FIG. 11d;

FIG. 12a shows a plan view of an open cross section bellow which uses double inversions that have a 90 degree initial wall angle;

FIG. 12b shows a folded view of the bellow shown in FIG. 12a;

FIG. 13a shows a plan view of a bellow derived from FIG. 12a which has alternating double inversions;

FIG. 13b shows a folded view of the bellow shown in FIG. 13a;

FIG. 14b shows a folded view of the bellow shown in FIG. 14a;

FIG. 15b shows a folded view of the bellow shown in FIG. 15a;

FIG. 16b shows a folded view of the bellow shown in FIG. 16a;

FIG. 17b shows a folded view of the bellow shown in FIG. 17a;

FIG. 18a shows a plan view of a closed cross section bellow derived from FIG. 16a which has alternating double inversions;

FIG. 18b shows a folded view of the bellow shown in FIG. 18a;

FIG. 19a shows a plan view of a closed cross section bellow derived from FIG. 18a which has all triangular panels;

FIG. 19b shows a folded view of the bellow shown in FIG. 19a;

FIG. 20a shows a plan view of a closed cross section bellow derived from FIG. 19a which has all triangular panels;

FIG. 20b shows a folded view of the bellow shown in FIG. 20a;

FIG. 20c illustrates that when one end of the bellow shown in FIG. 20a is twisted the longitudinal lines move up or down;

FIG. 21a shows a plan view of a closed cross section bellow derived from FIG. 20a which has all triangular panels;

FIG. 21b shows a folded view of the bellow shown in FIG. 21a;

FIG. 21c illustrates that when one end of the bellow shown in FIG. 21a is compressed the end will also rotate relative to the other end;

FIG. 22b shows a folded view of the bellow shown in FIG. 22a;

FIG. 23b shows a folded view of the bellow shown in FIG. 23a;

FIG. 24b shows a folded view of the bellow shown in FIG. 24a;

FIG. 25b shows a folded view of the bellow shown in FIG. 25a;

FIG. 26b shows a folded view of the bellow shown in FIG. 26a;

FIG. 27b shows a folded view of the bellow shown in FIG. 27a;

FIG. 28b shows a folded view of the bellow shown in FIG. 28a;

FIG. 29b shows a folded view of the bellow shown in FIG. 29a;

FIG. 30b shows a folded view of the bellow shown in FIG. 30a;

FIG. 31b shows a folded view of the bellow shown in FIG. 31a;

FIG. 32b shows a folded view of the bellow shown in FIG. 32a;

FIG. 33b shows a folded view of the bellow shown in FIG. 33a;

FIG. 34b shows a folded view of the bellow shown in FIG. 34a;

FIG. 35b shows a folded view of the bellow shown in FIG. 35a;

FIG. 36b shows a folded view of the bellow shown in FIG. 36a;

FIG. 37b shows a folded view of the bellow shown in FIG. 37a;

FIG. 38b shows a folded view of the bellow shown in FIG. 38a;

Figure 39A:
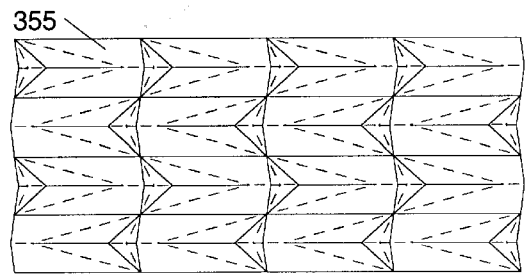
FIG. 39a shows a plan view of a bellow with a square cross section that uses quadruple inversions.
Figure 39B:
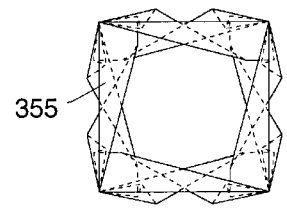
Figure 40A:
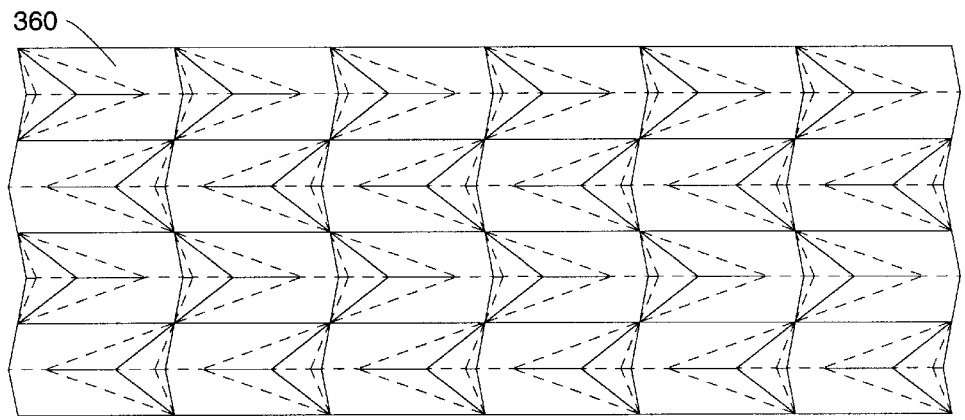
Figure 40B:
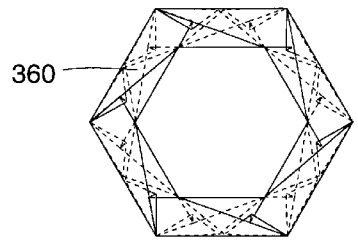

FIG. 39*b* shows a folded view of the bellow shown in FIG. 39*a*;

FIG. 40*a* shows a plan view of a bellow with a hexagonal cross section that uses quadruple inversions;

FIG. 40*b* shows a folded view of the bellow shown in FIG. 40*a*;

PREFERRED EMBODIMENT(S) OF THE INVENTION

This invention achieves its objectives by incorporating two or more single inversion fold patterns connected in series whose design angles are mathematically computed to minimize tilting of the bellow walls when the bellow is extended. It will be shown that a classic double inversion fold pattern is a special case of a more general double inversion fold pattern which will be presented here. Among other things, the analysis will show that an optimized double inversion fold pattern of the present invention can impose an order of magnitude less tilting of the bellow walls than a classic double inversion imposes. Furthermore, by adding a third single inversion to the series, the wall tilting can be reduced by another factor of 10. The theory is generalized so that wall tilt can be minimized given any number of single inversions connected in series.

It should be noted that the concepts of a single inversion, a classic double inversion, an optimized double inversion, and an "n" inversion fold pattern were created by the inventor to make explaining this invention easier, so the reader can absorb the present invention quickly and easily. After I present these concepts, the idea of putting multiple single inversions in series to minimize wall tilt may seem obvious to the reader, but since people skilled in the art of bellow manufacturing do have these concepts, and these concepts do not exist anywhere in known literature, the invention presented here would be far from obvious to them before reading the explanation presented here.

Figure 1:
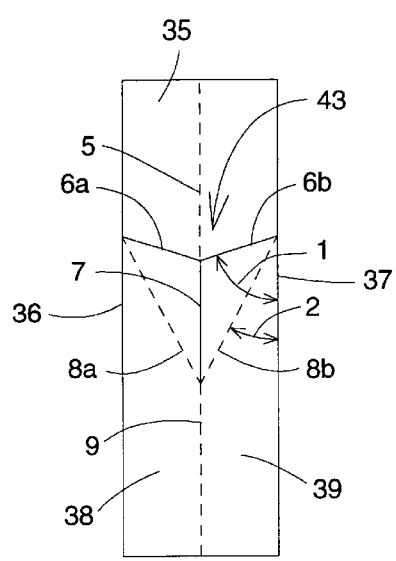
FIG. 1 is a plan view of a general double inversion fold pattern.
Figure 2:
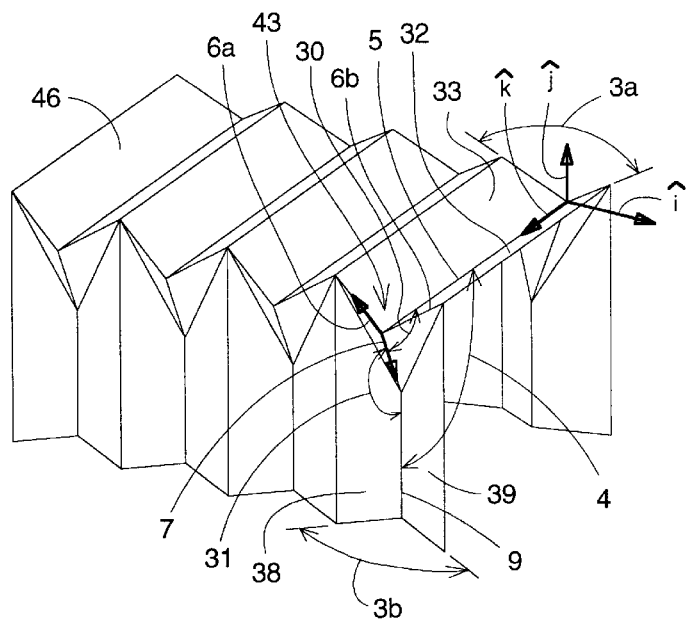
FIG. 2 is an isometric view of an open cross section bellow which uses several double inversion fold patterns.

In FIG. 1 in a flattened view, or plan view, generalized double inversion fold pattern 43 is shown drawn on foldable sheet of material 35. In a plan view in FIG. 1, all dashed lines drawn on sheet 35 represent inner folds (which create valleys when folded), and all solid lines drawn on sheet 35 represent outer folds (which create peaks when folded). FIG. 2 shows an isometric view of bellow 46 which uses a plurality of general double inversion fold patterns including double inversion fold pattern 43 shown in FIG. 1. General double inversion fold pattern 43, which forms a corner of bellow 46, consists of a series of two single inversion fold patterns, the first single inversion fold pattern consisting of longitudinal inner fold 5, diagonal outer fold 6*a*, diagonal outer fold 6*b*, and longitudinal outer fold 7. Diagonal folds 6*a* and 6*b* are mirror images of each other about longitudinal fold lines 5 and 7. Edges 36 and 37 of sheet 35 are equally spaced from and parallel to longitudinal fold lines 5, 7 and 9. When double inversion 43 is used with a plurality of other double inversions, edges 36 and 37 become outer folds. The first single inversion of double inversion 43 is characterized by arbitrary design angle 1, which is present between longitudinal edge 37 and diagonal fold 6*b*. The second single inversion fold pattern of double inversion 43 consists of longitudinal outer fold 7, diagonal inner fold 8*a*, diagonal inner fold 8*b*, and longitudinal inner fold 9. Like the first single inversion of double inversion 43, diagonal folds 8*a* and 8*b* are mirror images of each other about longitudinal fold lines 7 and 9. The second single inversion of double inversion 43 is characterized by arbitrary design angle 2, which is present between longitudinal edge 37 and diagonal fold 8*b*. When double inversion 43 is partially folded as shown in FIG. 2, so that bellow panels 38 and 39 make extension angle 3*a* between them, longitudinal fold lines 5 and 9 make wall angle 4 between them. By symmetry, extension angle 3*b* is always equal to extension angle 3*a*. As will be shown via analysis, when extension angle 3*a* changes, wall angle 4 changes as well, assuming all folds act as ideal hinges and all bellow panels remain rigid. The mathematical relationship between extension angle 3*a* and wall angle 4 entirely depends on the values a designer assigns to design angles 1 and 2.

Figure 7A:
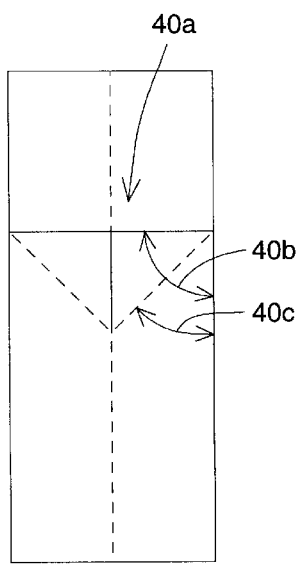
FIG. 7a is a plan view of a classic double inversion fold pattern which has a 90 degree initial wall angle.
Figure 7B:
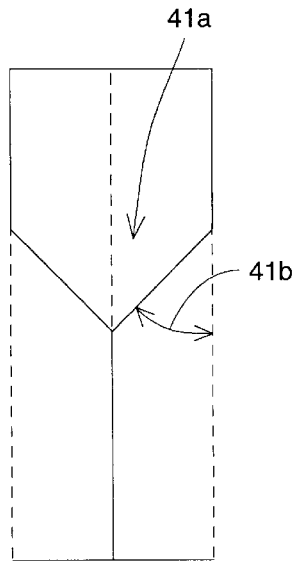
FIG. 7b is a plan view of a single inversion fold pattern which has a 90 degree initial wall angle.

When design angle 1 is set to 90 degrees, general double inversion 43 shown in FIG. 1 becomes a classic double inversion commonly used in industry, an example of which is shown in FIG. 7*a*. When design angle 2 is set to zero degrees, fold line 7 becomes infinitely long, and general double inversion 43 degenerates to a single inversion commonly used in industry, an example of which is shown in FIG. 7*b*. As will be shown for the present invention, design angles 1 and 2 can be set to novel values which make the change in wall angle 4 about ten times smaller than what classic single and double inversion folds give over a specified range of extension angle 3*a*. It will also be shown that design angles 1 and 2 can be set to novel values which make wall angle 4 decrease slightly and then return to the initial wall angle at a non zero extension angle, thus allowing, unlike all other prior art folds, a stiff bellow to be formed in an extended state using fast production techniques such as vacuum forming, blow molding, or injection molding. Also, a closed cross section bellow can be made elastically stable at the non zero extension angle which gives zero wall tilting, making the bellow useful for collapsible containers and extendible structures.

Figure 3:
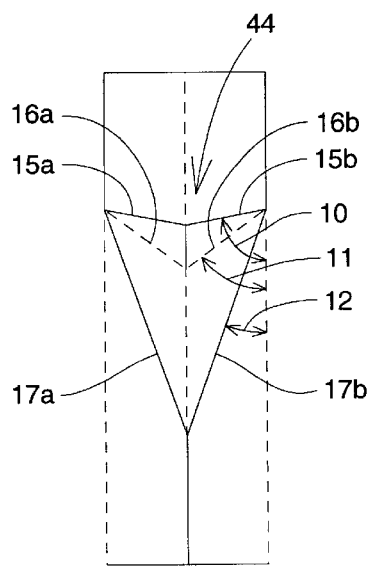
FIG. 3 is a plan view of a general triple inversion fold pattern.
Figure 4:
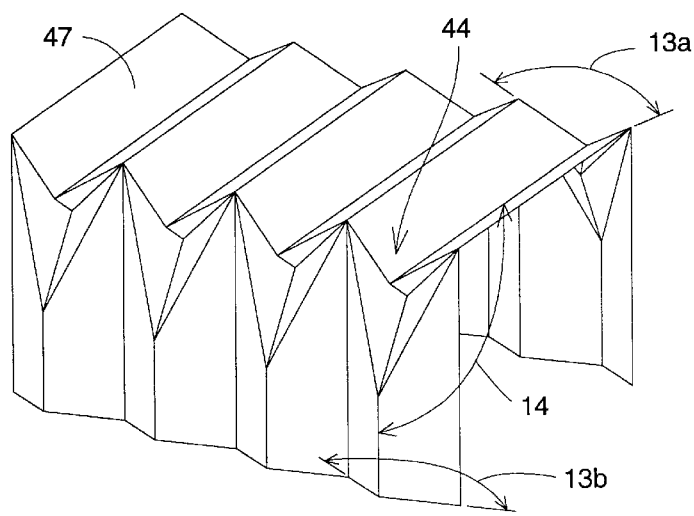
FIG. 4 is an isometric view of an open cross section bellow which uses several triple inversion fold patterns.

In FIG. 3 in a plan view, general triple inversion 44 is shown which forms a corner of bellow 47 in FIG. 4. General triple inversion 44 consists of a series of three single inversion fold patterns. General triple inversion 44, like general double inversion 43, is a novel mathematical construction which can represent both prior art fold patterns and fold patterns of the present invention. In FIG. 3, the first inversion includes outer diagonal folds 15*a* and 15*b*, the second inversion includes inner diagonal folds 16*a* and 16*b*, and the third inversion includes outer diagonal folds 17*a* and 17*b*. In FIG. 4 is shown an isometric view of an open cross section bellow which uses general triple inversion 43. For general triple inversion 43, design angle 10 is associated with the first inversion, design angle 11 is associated with the second inversion, and design angle 12 is associated with the third inversion. Together they dictate the mathematical relationship between extension angle 13*a* and wall angle 14. By symmetry, extension angle 13*b* is always equal to extension angle 13*a*.

Although a triple inversion is more complex than a double inversion, the third design angle gives a designer more control over how the wall angle changes with the extension angle. For example, if a designer wishes to minimize the change in wall angle, a triple inversion can give a change that is about ten times smaller than what a double inversion can give (or about one hundred times less than what prior art folds give) over a specified extension angle range. Also, if a designer wishes to create an elastically bi-stable bellow, the designer can customize how the wall angle changes with extension angle more exactly than is possible using a double inversion.

Figure 5:
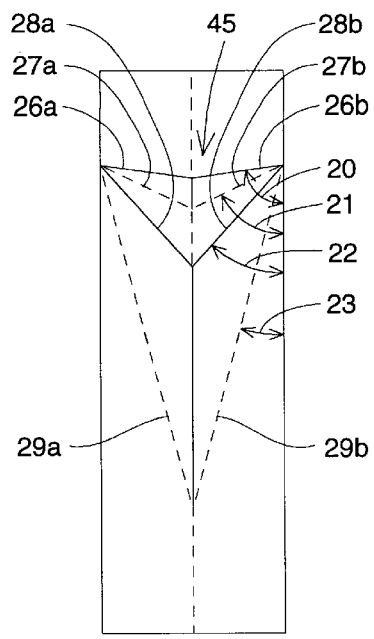
FIG. 5 is a plan view of a general quadruple inversion fold pattern.
Figure 6:
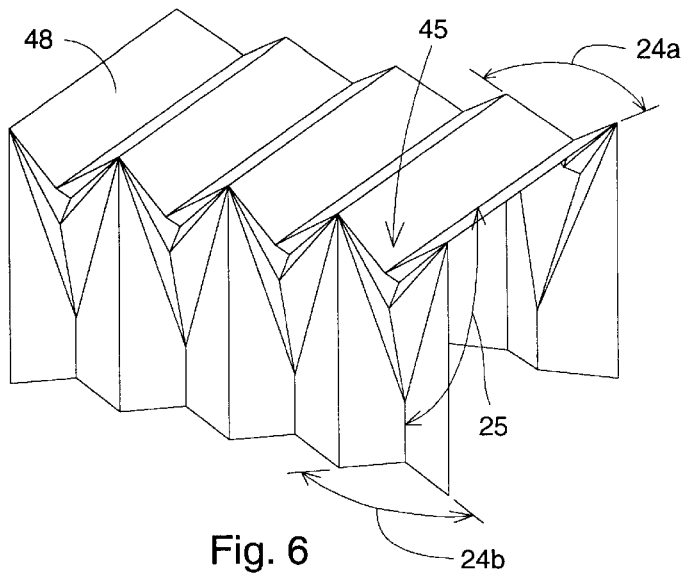
FIG. 6 is an isometric view of an open cross section bellow which uses several quadruple inversion fold patterns.

In FIG. 5 in a folded flat view, general quadruple inversion 45 which forms a corner of bellow 48 in FIG. 6. General quadruple inversion 45 consists of a series of four single inversion fold patterns. In FIG. 4, the first inversion includes outer diagonal folds 26a and 26b, the second inversion includes inner diagonal folds 27a and 27b, the third inversion includes outer diagonal folds 28a and 28b, and the fourth inversion includes inner diagonal folds 29a and 29b. In FIG. 6 is shown an isometric view of open cross section bellow 48 which uses general quadruple inversion 45. For general quadruple inversion 48, design angle 20 is associated with the first inversion, design angle 21 is associated with the second inversion, design angle 22 is associated with the third inversion, and design angle 23 is associated with the fourth inversion. Together they dictate the functional relationship between the extension angle 24a and wall angle 25. By symmetry, extension angle 24b is always equal to extension angle 24a.

Although a quadruple inversion is more complex than a triple inversion, the fourth design angle gives a designer even more control over how the wall angle changes with the extension angle. If a designer wishes to minimize the change in wall angle, a quadruple inversion can give a change that is about ten times smaller than what a triple inversion can give (or about one thousand times less than what prior art folds give) over a specified extension angle range. Also, if a designer wishes to create an elastically bi-stable bellow, a designer can customize how the wall angle changes with extension angle more exactly than is possible using a triple inversion.

The mathematical relationship between the wall angle and the extension angle for an "n" inversion fold is now derived for the present invention. To begin the analysis, a single inversion is analyzed, and then several inversions are connected in series. As mentioned previously, the mathematical relationship is derived assuming the fold lines act as ideal hinges and the bellow panels remain perfectly rigid.

Given a single inversion which includes diagonal folds 6a and 6b in FIG. 1, characterized by the design angle 1, wall angle 30 verses the extension angle 3a is derived via vector trigonometry. Establishing the $\hat{i}, \hat{j}, \hat{k}$ coordinate system in FIG. 2 such that the $\hat{j}$–$\hat{k}$ plane bisects bellow panels 32 and 33, vectors $\overline{V}_1$ and $\overline{V}_2$, lying along fold lines 6a and 7, respectively, are expressed as $$\overline{V}_1 = -\sin(\alpha/2)\sin(\chi_1)\hat{i} + \cos(\alpha/2)\sin(\chi_1)\hat{j} - \cos(\chi_1)\hat{k} \quad (1)$$

$$\overline{V}_2 = -\sin(\beta_1)\hat{j} - \cos(\beta_1)\hat{k} \quad (2)$$

where $\chi_1$ represents design angle 1, $\beta_1$ represents wall angle 30, and $\alpha$ represents extension angle 3a. Assuming no deformation of any bellow panels, the angle between vectors $\overline{V}_1$ and $\overline{V}_2$ must remain constant at $180-\chi_1$. This constraint is imposed by Equation (3).

$$\overline{V}_1 \cdot \overline{V}_2 = |\overline{V}_1||\overline{V}_2|\cos(180-\chi_1) \quad (3)$$

After substituting Equations (1) and (2) into Equation (3), performing the dot product, and applying some trigonometric identities, wall angle $\beta_1$ is expressed in radians as $$\beta_1 = \pi - 2\tan^{-1}(\cos(\alpha/2)\tan(\chi_1)) \quad (4)$$

where $\chi_1$ is design angle 1, and $\alpha$ is extension angle 3a.

Generalizing Equation (4), the wall angle $\beta_i$ associated with inversion "i" is given by $$\beta_i = \pi - 2\tan^{-1}(\cos(\alpha/2)\tan(\chi_1)) \quad (5)$$

where $\chi_i$ is design angle "i", and $\alpha$ is extension angle 3a.

Using Equation (5), the wall angle verses extension angle imposed by an "n" inversion fold pattern of the present invention can be systematically derived.

For a general double inversion, wall angle 4, represented by $^2\beta^*$, is given by $$^2\beta^* = \beta_1 + (\pi - \beta_2) \quad (6)$$

$$^2\beta^* = \pi - 2\tan^{-1}(\cos(\beta/2)\tan(\chi_1)) + 2\tan^{-1}(\cos(\alpha/2)\tan(\chi_2)) \quad (7)$$

where $\chi_1$ and $\chi_2$ represent design angles 1 and 2, respectively, $\beta_1$ represents wall angle 30, $\beta_2$ represents wall angle 31, and $\alpha$ represents extension angle 3a.

For a general triple inversion, wall angle 14, represented by $^3\beta^*$ is given by $$^3\beta^* = \beta_1 + (\pi - \beta_2) - (\pi - \beta_3) \quad (8)$$

$$^3\beta^* = \pi - 2\tan^{-1}(\cos(\alpha/2)\tan(\chi_1)) + \quad (9)$$
$$2\tan^{-1}(\cos(\alpha/2)\tan(\chi_2)) - 2\tan^{-1}(\cos(\alpha/2)\tan(\chi_3))$$

where $\chi_1$, $\chi_2$, and $\chi_3$ represent the design angles 10, 11, and 12, respectively, and $\alpha$ represents extension angle 13a.

For a general quadruple inversion, wall angle 25, represented by $^4\beta^*$, is given by $$^4\beta^* = \beta_1 + (\pi - \beta_2) - (\pi - \beta_3) + (\pi - \beta_4) \quad (10)$$

$$^4\beta^* = \pi - 2\tan^{-1}(\cos(\alpha/2)\tan(\chi_1)) + 2\tan^{-1}(\cos(\alpha/2)\tan(\chi_2)) - \quad (11)$$
$$2\tan^{-1}(\cos(\alpha/2)\tan(\chi_3)) + 2\tan^{-1}(\cos(\alpha/2)\tan(\chi_4))$$

where $\chi_1$, $\chi_2$, $\chi_3$, and $\chi_4$ represent design angles 20, 21, 22, and 23, respectively, and $\alpha$ represents extension angle 24a.

For an "n" inversion fold pattern, $^n\beta^*$ is given by $$^n\beta^* = \pi + 2\sum_{i=1}^{n}\tan^{-1}(\cos(\alpha/2)\tan(\chi_i))(-1)^i \quad (12)$$

In most cases, a designer will specify an initial wall angle $\beta_{\alpha 1}^*$ that a fold pattern should have at some initial extension angle $\alpha_1$. Given $\alpha_1$ and $\beta_{\alpha 1}^*$ for an "n" inversion fold pattern, one design angle can be eliminated from Equation (12), leaving n−1 design angles to be manipulated freely by a designer to customize how wall angle $^n\beta^*$ changes with extension angle $\alpha$. By making the substitutions $\alpha = \alpha_1$ and $^n\beta^* = \beta_{\alpha 1}^*$ into Equation (12), the design angle $\chi_1$ is eliminated.

$$\chi_1 = \tan^{-1}\left(\frac{\tan\left(\frac{\pi - \beta_{\alpha 1}^*}{2} + \sum_{i=2}^{n}\tan^{-1}(\cos(\alpha_1/2)\tan(\chi_i))(-1)^i\right)}{\cos(\alpha_1/2)}\right) \quad (13)$$

For the common case when a designer specifies an initial wall angle $\beta_0^*$ at a zero initial extension angle $\alpha_1 = 0$, Equation (13) simplifies to $$\chi_1 = \frac{\pi - \beta_0^*}{2} + \sum_{i=2}^{n}\chi_i(-1)^i \quad (14)$$

Equation (12), used with Equation (13), is an extremely powerful and general equation. For any number of inversions, a designer can specify any initial wall angle $\beta_{\alpha 1}^*$ at any $\alpha_1$, and then customize how the wall angle $^n\beta^*$ varies with the extension angle $\alpha$ by changing the design angles $\chi_2$ through $\chi_n$. The fold patterns represented by Equation (12), which form the corner of a bellow, can be connected in a great many ways by a designer to create an infinite variety of open cross section and closed cross section bellows which extend long distances with low strain and are ideally suited for making very low cost mass produced plastic bellows via blow molding, vacuum forming, injection molding, or similar processes.

One desirable way a designer can customize $^n\beta^*$ of the present invention is to minimize how much the wall angle $^n\beta^*$ changes over a specified extension angle range from $\alpha_1$ to $\alpha_2$. The wall angle change is quantified here by computing the root mean square of the wall angle change function $^n\Delta\beta^*(\alpha)$ over a range from $\alpha_1$ to $\alpha_2$.

$$^n\Delta\beta^*(\alpha) = {^n\beta^*(\alpha)} - \beta^*_{\alpha I} \quad (15)$$

$$^n\Delta\beta^*_{RMS}(\alpha_1, \alpha_2) = \sqrt{\frac{\int_{\alpha_1}^{\alpha_2} (^n\Delta\beta^*(\alpha))^2 d\alpha}{\alpha_2 - \alpha_1}} \quad (16)$$

For the sake of discussion, Equation (16) will be referred to as the RMS wall angle change.

Another desirable way a designer can customize $^n\beta^*$ of the present invention is to make a bellow have exactly zero wall tilting at a non zero extension length. More specifically, the "n" inversion fold patterns of the present invention can be designed so that as $\alpha$ is extended beyond the initial extension angle $\alpha_1$, the wall angle $^n\beta^*$ deviates slightly from its initial value $\beta_{\alpha 1}^*$ and then returns back to $\beta_{\alpha 1}^*$ at some second root extension angle $\alpha_{r2}$, allowing a bellow to be free of elastic strain at the second root extension angle $\alpha_{r2}$. Fold patterns having a second root extension angle, which are unique to the present invention, are ideal for manufacturing because they can be easily manufactured with zero wall tilt in an extended state while also providing exactly zero distortion of the bellow panels in the compressed state. In contrast, the single inversion, the classic double inversion, and the Pavchinskii double inversion have only one root extension angle. Therefore, if these prior art folds are formed in an extended state with zero wall tilt, the walls will tilt continuously as the bellow is compressed, causing severe crinkling and buckling of a closed cross section bellow if it is made from non rubbery materials. Also, fold patterns of the present invention having a second root extension angle can be used to make bellows for expanding structures and collapsible containers, which tend to pop open to the zero strain $\alpha_{r2}$ position when expanded, and pop closed to the zero strain $\alpha_1$ position when compressed.

To find each extension angle root $\alpha_{ri}$ of a fold pattern, Equation (15) is set to zero yielding $$^n\beta^*(\alpha) - \beta_{\alpha 1}^* = 0 \quad (17)$$

and all values of $\alpha$ which satisfy Equation (17) are solved for numerically. By the definition of $\beta_{\alpha 1}^*$, Equation (17) will always have a first root at $\alpha=\alpha_1$. In general, for an "n" inversion fold pattern of the present invention, Equation (17) can have a maximum of n−1 roots beyond $\alpha_1$, meaning that a bellow using an "n" inversion fold pattern can have at most n−1 positions beyond the initial extension angle at which zero wall tilt is present.

Figure 7C:
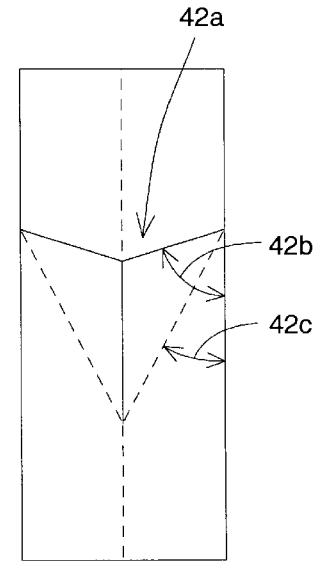
FIG. 7c is a plan view of an optimized double inversion fold pattern of the present invention which has a 90 degree initial wall angle.
Figure 7D:
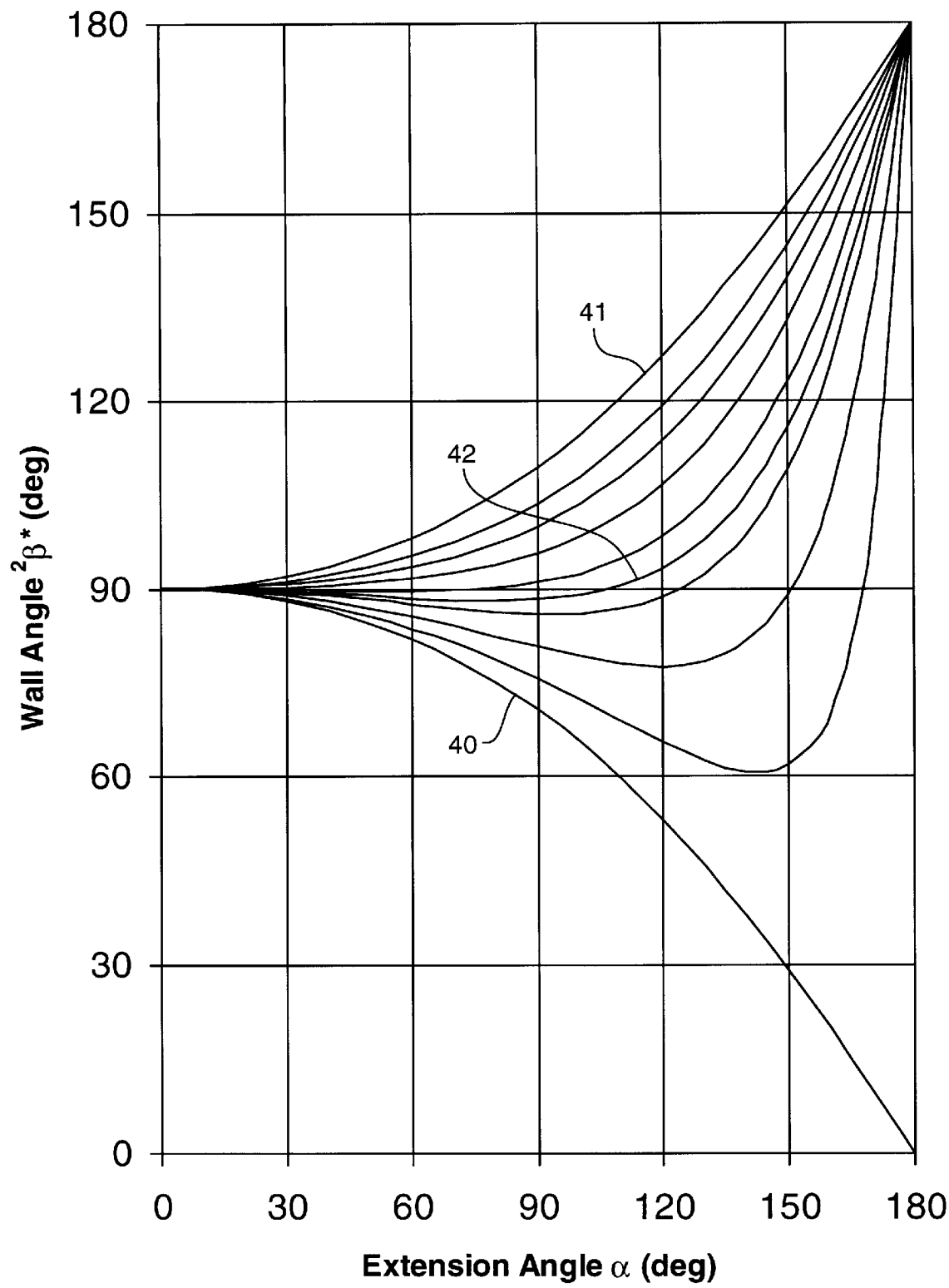
FIG. 7d is a plot of wall angle versus extension angle and design angle 2 for a family of double inversion fold patterns which have a 90 degree initial wall angle.

In a specific application of the equations just derived, FIG. 7d shows a plot which illustrates how the wall angle of a general double inversion varies with $\alpha$ and $\chi_2$, when the initial wall angle is 90 degrees. A useful measure that is determined by $\alpha$ is the percentage by which the fold is extended, which is defined as $$\% \text{ Extended} = 100\% \cdot \sin(\alpha/2) \quad (18)$$

In general, designers seek to achieve the highest possible percent extension in order to reduce the material required, reduce the compressed length, reduce the bellow weight, and reduce the number of folds of a bellow.

With $\beta_{\alpha 1}^*=90$ degrees, n=2, and $\alpha_1=0$, Equation (14) yields the relation $\chi_1=45+\chi_2$ degrees, leaving $\chi_2$ to be varied arbitrarily. In FIG. 7d trajectory 42 shows a useful $\chi_1=72.57$, $\chi_2=27.57$ embodiment of the present invention; a double inversion which has been optimized to minimize the RMS wall angle change in the range from $\alpha_1=0$ to $\alpha_2=120$ degrees. FIG. 7c shows a plan view of the optimized pattern with design angle 42a at 72.57 degrees and design angle 42b at 27.57 degrees. By visual inspection of FIG. 7d, one can see how much less trajectory 42 deviates from 90 degrees than do trajectories 41 and 40, which correspond respectively to a single inversion shown in FIG. 7b and a classic double inversion shown in FIG. 7a whose initial wall angles are 90 degrees. Quantitatively, in the range from $\alpha_1=0$ to $\alpha_2=120$ degrees, $^2\Delta\beta_{RMS}^*=16.51$ degrees for the single inversion or the classic double inversion, and $^2\Delta\beta_{RMS}^*=1.35$ degrees (12.2 times smaller) for the $\chi_1=72.57$, $\chi_2=27.57$ embodiment of the present invention.

In addition to imposing low wall angle change, the $\chi_1=72.57$, $\chi_2=27.57$ embodiment of the present invention has a second root extension angle of $\alpha=106.1$ degrees, and hence can be manufactured with zero wall tilt at $\alpha=106.1$ degrees while also imposing zero wall tilt when fully compressed. As mentioned earlier, bellows of the present invention which have a second root extension angle are easily blow molded, thermoformed, or injection molded while in the second root extended state, and can then be compressed without imposing gross distortions on the bellow material.

For reference, Table 1 shows a family of optimized minimal distortion double inversion embodiments that have a 90 degree initial wall angle.

TABLE 1

| Minimal Distortion Double Inversions $\beta_o^* = 90$ degrees | | | | % Extended | RMS Distortion $^2\Delta\beta^*_{RMS}(0,\alpha_2)$ | Single Inversion $x_1 = 45, x_2 = 0$ $^2\Delta\beta^*_{RMS}(0,\alpha_2)$ | Classic Double Inversion $x_1 = 90, x_2 = 45$ $^2\Delta\beta^*_{RMS}(0,\alpha_2)$ | Factor distortion is reduced |
|---|---|---|---|---|---|---|---|---|
| $x_1$ | $x_2$ | $\alpha_{r2}$ | $\alpha_2$ | | | | | |
| 67.5 | 22.5 | 0 | 0 | 0% | 0 | 0 | 0 | — |
| 67.76 | 22.76 | 25.99 | 30 | 26% | 0.004 | 0.92 | 0.92 | 259.2 |
| 68.59 | 23.59 | 52.16 | 60 | 50% | 0.061 | 3.77 | 3.77 | 62.0 |
| 70.10 | 25.10 | 78.75 | 90 | 71% | 0.349 | 8.83 | 8.83 | 25.3 |
| 72.57 | 27.57 | 106.10 | 120 | 87% | 1.354 | 16.51 | 16.51 | 12.2 |
| 76.69 | 31.69 | 134.93 | 150 | 97% | 4.716 | 27.17 | 27.17 | 5.8 |

As can be seen, from small values to large values of extension angle limit $\alpha_2$, the minimal distortion embodiments produce many times less RMS wall angle change than the prior art folds, and they each have a second root extension angle $\alpha_{r2}$, making them ideally suited for forming in an extended state.

An important design rule for all double inversion folds is that as the extension limit $\alpha_2$ approaches zero, the second root extension angle $\alpha_{r2}$ approaches zero as well, and the optimum design angles which create minimal RMS wall angle change approach the lower limits in radians of $$\chi_1 = \frac{\pi}{2} - \frac{\beta_0^*}{4} \quad (19)$$

$$\chi_2 = \frac{\beta_0^*}{4} \quad (20)$$

where $\beta_0^*$ is the initial wall angle specified by the designer when $\alpha=0$. For example, as is shown in Table 1, for which $\beta_0^*=90$ degrees, the minimal distortion design angles shown are all larger than the lower limits of $\chi_1=67.5$ degrees and $\chi_2=22.5$ degrees computed from Equations (19) and (20).

Applying Equations (19) and (20) to a hexagonal bellow with an initial wall angle of 120 degrees yields lower limit design angles of $\chi_1=60$ degrees and $\chi_2=30$ degrees, which are the prior art design angles of the Pavchinskii double inversion. While the Pavchinskii design is geometrically elegant and symmetrical, it does not provide minimal RMS wall angle change, and it does not have a second root extension angle, making blow molding and thermoforming such a bellow more problematic. For comparison, the RMS wall angle change when $\alpha 2=120$ degrees for the Pavchinskii double inversion is 3.62 degrees, while for an equivalent optimal fold of the present invention, for which $\chi_1=66.18$ degrees and $\chi_2=36.18$ degrees, the RMS wall angle change is reduced 3 times to 1.17 degrees. Furthermore, the Pavchinskii double inversion does not have a second root extension angle, whereas the $\chi_1=66.18$ degree, $\chi_2=36.18$ degree embodiment of the present invention does have a second root extension angle at $\alpha=105.8$ degrees, allowing for zero distortion blow molding or thermoforming in the $\alpha=105.8$ degree extended state.

Figure 8:
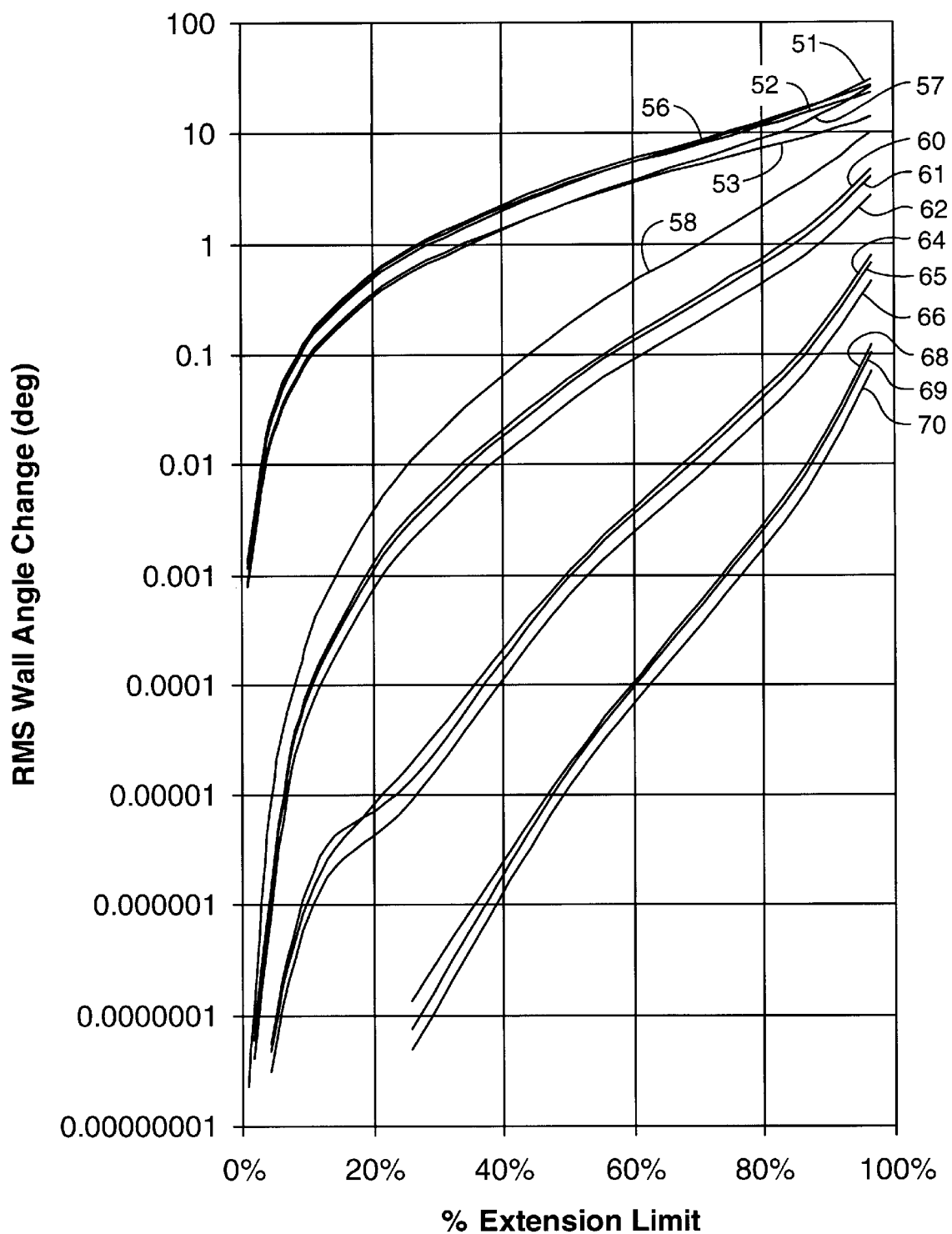
FIG. 8 is a plot of RMS wall angle change versus percent extension limit for single inversions, classic double inversions, a fold pattern proposed by Pavchinskii, and for optimized double, triple, and quadruple inversions of the present invention.

Using Equation (12) and a numerical version of (16) in macros coded into an Excel® spreadsheet and using the Excel Solver® multivariable optimization algorithm, the RMS wall angle change for double, triple and quadruple inversions has been minimized for several initial wall angles over several % extension limit ranges, providing designers with a very powerful and useful plot for comparing the advantages of various embodiments of the present invention (see FIG. 8). Trajectories 51, 52, and 53 in FIG. 8 show the RMS wall angle change of single inversions with initial wall angles $\beta_0^*$ of 90 degrees, 120 degrees, and 144 degrees, respectively. These three values for wall angle $\beta_0^*$ correspond respectively to the wall angels of a square, a hexagon, and a uniform ten sided polygon, and hence span a wide spectrum of possible bellow designs. Trajectories 51, 56, and 57 show the RMS wall angle change of classic double inversions with initial wall angles $\beta_0^*$ of 90 degrees, 120 degrees, and 144 degrees, respectively. Trajectory 58 shows the RMS wall angle change of a Pavchinskii double inversion, for which $\beta_0^*$ is 120 degrees, $\chi_1=60$ degrees, and $\chi_2=30$ degrees. Trajectories 60, 61, and 62 show the RMS wall angle change of optimized double inversions of the present invention with initial wall angles $\beta_0^*$ of 90 degrees, 120 degrees, and 144 degrees, respectively. Trajectories 64, 65, and 66 show the RMS wall angle change of optimized triple inversions of the present invention with initial wall angles $\beta_0^*$ of 90 degrees, 120 degrees, and 144 degrees, respectively. Trajectories 68, 69, and 70 show the RMS wall angle change of optimized quadruple inversions of the present invention with initial wall angles $\beta_0^*$ of 90 degrees, 120 degrees, and 144 degrees, respectively.

An easy to remember approximate result shown in FIG. 8 is that for a given range limit $\alpha_2$, which corresponds to a given % extension limit computed using Equation (18), an optimized double inversion imposes better than 10 times less RMS wall angle change than the single inversions and classic double inversions, an optimized triple inversion imposes better than 100 times less, and an optimized quadruple inversion imposes better than 1000 times less. Another useful rule of thumb is that the RMS wall angle change of the optimized inversions grows about an order of magnitude for every 20% that is added to the extension limit. Thus, if a designer demands very low RMS wall angle change, they can achieve very much lower distortions by increasing the number of inversions from two to three, or if the simplicity of the double inversion is sought to keep tooling costs low, the extension limit can be reduced by about 20% to achieve roughly the same results.

FIG. 8 is readily used by a designer to estimate how much farther a bellow of the present invention can extend than prior art bellows, given an allowed RMS wall angle change. For example, suppose a designer wants to make a square closed cross section bellow from a foldable sheet of plastic material, such as a 0.01 inch thick polypropylene sheet, which is compliant enough to tolerate an RMS wall angle change of 1 degree. From FIG. 8, for an RMS wall angle change of 1 degree, single inversions and classic double inversions could extend up to about 27%, an optimized double inversion could extend up to about 83% (3.07 times farther), and optimized triple or quadruple inversions could extend more than 97% (3.6 times farther). For this example, a designer could reduce the material used, the mass, the bellow surface area, the number of folds required, and the compressed length by a factor of about 3 using an optimized double inversion, and about 3.6 using optimized triple and quadruple inversions. The compressed length of the bellow, which is also a very important design consideration, can be reduced by up to the same respective factors of improvement, depending on how the fold inversions are arranged on a particular bellow. All of these improvements are tremendously useful to a designer, because they both reduce the cost and improve the performance of the bellow.

For further reference, Table 2 shows minimal distortion design angles which were calculated for $\beta_0^*=60$ degrees, 90 degrees, 120 degrees, and 144 degrees, over a range of extension angle limits $\beta_2$.

TABLE 2

| | % | Optimized Double Inversions | | Optimized Triple Inversions | | | Optimized Quadruple inversions | | | |
|---|---|---|---|---|---|---|---|---|---|---|
| $\alpha_2$ | Extended | $x_1$ | $x_2$ | $x_1$ | $x_2$ | $x_3$ | $x_1$ | $x_2$ | $x_3$ | $x_4$ |
| $\beta_o^* = 60$ degrees | | | | | | | | | | |
| 30 | 26% | 75.19 | 15.19 | 80.18 | 40.52 | 20.34 | 82.92 | 54.20 | 39.32 | 8.04 |
| 60 | 50% | 75.77 | 15.77 | 80.61 | 41.77 | 21.16 | 83.05 | 54.59 | 39.61 | 8.07 |
| 90 | 71% | 76.84 | 16.84 | 81.46 | 44.31 | 22.85 | 83.65 | 56.90 | 41.97 | 8.72 |
| 120 | 87% | 78.60 | 18.60 | 82.81 | 48.52 | 25.71 | 84.72 | 61.12 | 46.40 | 9.99 |
| 150 | 97% | 81.62 | 21.62 | 85.01 | 55.85 | 30.84 | 86.41 | 68.20 | 54.16 | 12.36 |
| $\beta_o^* = 90$ degrees | | | | | | | | | | |
| 30 | 26% | 67.76 | 22.76 | 75.19 | 45.37 | 15.19 | 79.09 | 57.16 | 34.80 | 11.73 |
| 60 | 50% | 68.59 | 23.59 | 75.90 | 46.80 | 15.91 | 79.48 | 58.03 | 35.55 | 12.00 |
| 90 | 71% | 70.10 | 25.10 | 77.14 | 49.36 | 17.22 | 80.46 | 60.46 | 38.06 | 13.07 |
| 120 | 87% | 72.57 | 27.57 | 79.12 | 53.58 | 19.46 | 82.04 | 64.43 | 42.33 | 14.93 |
| 150 | 97% | 76.69 | 31.69 | 82.37 | 60.86 | 23.49 | 84.55 | 71.07 | 49.92 | 18.40 |
| $\beta_o^* = 120$ degrees | | | | | | | | | | |
| 30 | 26% | 60.32 | 30.32 | 70.30 | 50.46 | 10.16 | 75.52 | 60.96 | 31.14 | 15.70 |
| 60 | 50% | 61.33 | 31.33 | 71.14 | 51.76 | 10.62 | 75.98 | 61.71 | 31.74 | 16.01 |
| 90 | 71% | 63.18 | 33.18 | 72.75 | 54.26 | 11.52 | 77.24 | 63.93 | 34.05 | 17.37 |
| 120 | 87% | 66.18 | 36.18 | 75.33 | 58.38 | 13.06 | 79.31 | 67.62 | 38.10 | 19.79 |
| 150 | 97% | 71.02 | 41.02 | 79.55 | 65.38 | 15.84 | 82.63 | 73.72 | 45.37 | 24.28 |
| $\beta_o^* = 144$ degrees | | | | | | | | | | |
| 30 | 26% | 54.35 | 36.35 | 66.34 | 54.43 | 6.10 | 72.64 | 63.92 | 28.12 | 18.85 |
| 60 | 50% | 55.46 | 37.46 | 67.27 | 55.64 | 6.36 | 73.16 | 64.61 | 28.64 | 19.19 |
| 90 | 71% | 57.49 | 39.49 | 69.19 | 58.12 | 6.93 | 74.64 | 66.66 | 30.80 | 20.78 |
| 120 | 87% | 60.77 | 42.77 | 72.18 | 62.05 | 7.86 | 77.08 | 70.08 | 34.61 | 23.61 |
| 150 | 97% | 65.94 | 47.94 | 77.12 | 68.68 | 9.56 | 81.02 | 75.70 | 41.51 | 28.83 |

In general, Equations (12) and (16) are easily used by a designer to compute minimal distortion design angles such as those shown in Table 2 given any initial wall angle and given any extension angle limit $\alpha_2$.

To show examples of what some of the optimized folds look like, FIG. 9a through FIG. 11h show scale plan and folded views of optimized double, triple, and quadruple inversions, with initial wall angles of $\alpha_o^*=60$ degrees, 90 degrees, 120 degrees and 144 degrees, whose design angles correspond to the minimal distortion values shown in Table 2 with the extension angle limit $\beta_2=120$ degrees. FIG. 9a, FIG. 9b, FIG. 9c, FIG. 9d show folded views and FIG. 9e, FIG. 9f, FIG. 9g, FIG. 9h show plan views of double inversions with initial wall angles of $\beta_0^*=60$ degrees, 90 degrees, 120 degrees and 144 degrees, respectively. FIG. 10a, FIG. 10b, FIG. 10c, FIG. 10d show folded views and FIG. 10e, FIG. 10f, FIG. 10g, FIG. 10h show plan views of triple inversions with initial wall angles of $\beta_0^*=60$ degrees, 90 degrees, 120 degrees and 144 degrees, respectively. FIG. 11a, FIG. 11b, FIG. 11c, FIG. 11d show folded views and FIG. 11e, FIG. 11f, FIG. 11g, FIG. 11h show plan views of quadruple inversions with initial wall angles of $\beta_0^*=60$ degrees, 90 degrees, 120 degrees and 144 degrees, respectively.

By using a few simple design techniques for connecting folds, a designer can construct an infinite variety of useful bellows using the customizable fold patterns of the present invention. The construction techniques for connecting folds, which are applicable to any bellow design, will be demonstrated via several examples.

In general, the bellow embodiments which will be shown can be made from any foldable material which has the required fatigue life for a given application. Of note, thin gauge polypropylene sheeting, with a thickness in the range from 0.001 inches to 0.015 inches, is an ideal material for forming into bellows of the present invention, because it is known to have a long fatigue life operating as a living hinge, it is highly formable, abrasion resistant, and very low in cost. The thinner gauges could be used for light dust covers, while the thicker gauges could be used for machine tools. To achieve higher structural rigidity, gages thicker than 0.015 inches could be used with notches machined or stamped along the fold lines to facilitate folding. Other suitable materials are ultra high molecular weight polyethylene and polyester sheeting or film. For particular applications, more specialized engineering plastics may be chosen by those skilled in the art of plastic material selection.

To begin, FIG. 12a shows a plan view and FIG. 12b shows a folded view of open cross section bellow 110 which uses several identical minimal distortion double inversions with 90 degree initial wall angles 112 and 113. In the FIG. 12b folded view the edges 114, 115, and 116 define a cross sectional profile of bellow 110. On bellow 110, successive double inversions such as 117 and 118 point in the same direction allowing easy drainage of chips and fluid off of top bellow panels such as 119, hence making bellow 110 useful for machine tools and other applications that involve chips and fluids.

FIG. 13a shows a plan view and FIG. 13b shows a folded view of open cross section bellow 120 using several alternating minimal distortion double inversions with 90 degree initial wall angles 122 and 123. Successive double inversions such as 124 and 125 point in alternating directions down the length of bellow 120. The advantage of the alternating fold design on bellow 120 is that it has a compressed length which is two thirds as long as the compressed length of the non alternating design on bellow 110, given the same amount of material and given fold lengths 126 and 127 are equal. A disadvantage of the alternating fold design on bellow 120 is that the double inversions such as 125 which are on top of the bellow could collect chips and other debris, which could eventually cause damage. Therefore, bellow 120 is most useful for applications which do not dump chips onto the bellow, such as for dust covers.

Figure 14A:
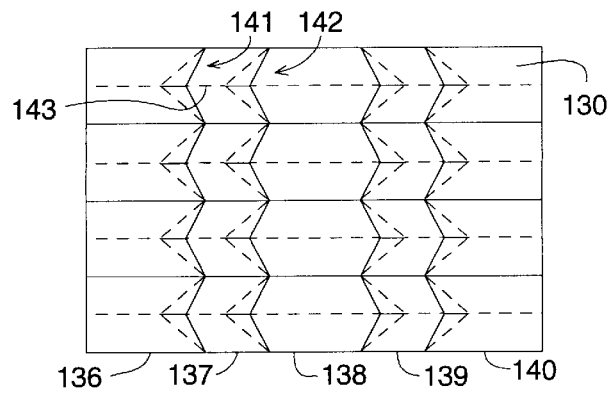
FIG. 14a shows a plan view of an open cross section bellow using double inversions that have a 135 degree initial wall angle.
Figure 14B:
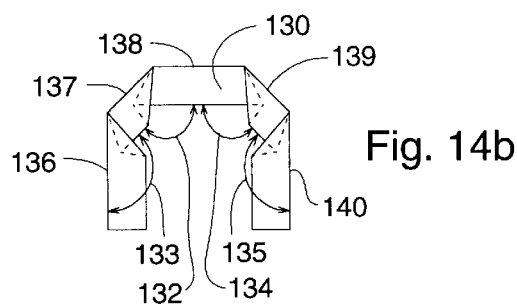

FIG. 14a shows a plan view and FIG. 14b shows a folded view of open cross section bellow 130 using several identical minimal distortion double inversions with 135 degree initial wall angles 132, 133, 134, and 135. Edges 136, 137, 138, 139, and 140 define a cross sectional profile of the bellow. Two double inversions 141 and 142 point in the same direction away from top edge 138, allowing for unimpeded fluid drainage from the top of bellow 130. As a variation of this design, double inversions such as 141 and 142 can point in either direction, in any combination. To achieve a shorter compressed length double inversions such as 141 and 142 can point in alternating directions, as is shown in FIG. 13a.

Figure 15A:
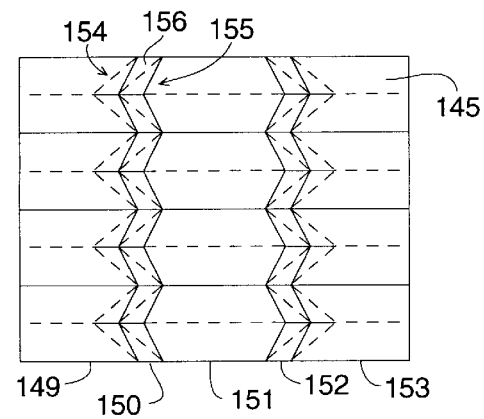
FIG. 15a shows a plan view of a bellow derived from the bellow in FIG. 14a by setting the length of some longitudinal inner folds to zero.
Figure 15B:
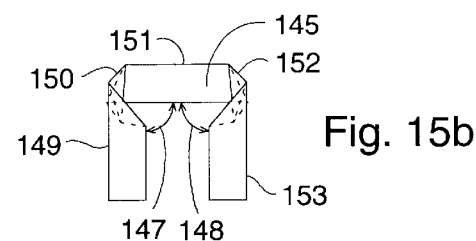

FIG. 15a shows a plan view and FIG. 15b shows a folded view of useful open cross section bellow 145 derived from bellow 130 by setting the length of the longitudinal inner fold lines such as 143 to zero. Edges 149, 150, 151, 152, and 153 define a cross sectional profile of bellow 145. The advantage of this embodiment is that triangular panels such as 156 present between double inversions such as 154 and 155 increase the structural rigidity of bellow 145 and thereby reduces its propensity to bow upward in the middle when it is compressed, and also reduces its propensity to sagging under its own weight. Also, this embodiment effectively has 90 degree wall angles 147 and 148, making it interchangeable with bellow embodiments 110 and 120.

Figure 16A:
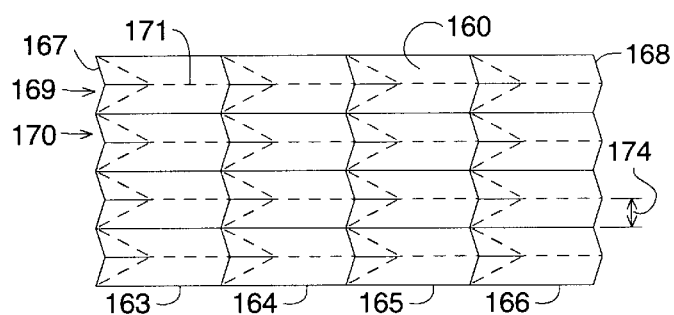
FIG. 16a shows a plan view of a closed cross section bellow using double inversions that have a 90 degree initial wall angle.
Figure 16B:
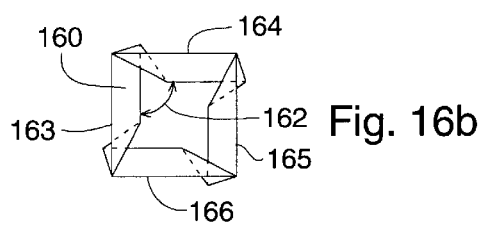

FIG. 16a shows a plan view and FIG. 16b shows a folded view of a closed cross section bellow 160 using several identical minimal distortion double inversions such as 169 and 170 with 90 degree initial wall angles such as 162. In the plan view in FIG. 16a, edges 167 and 168 coincide with one another to form a continuous closed cross section. Edges 163, 164, 165, and 166 define a cross sectional profile of bellow 160. Closed cross section bellows, such as bellow 160, can be folded from a tube, or created by folding one or more sheets separately and then bonding the folded sheets to form a closed cross section.

Figure 17A:
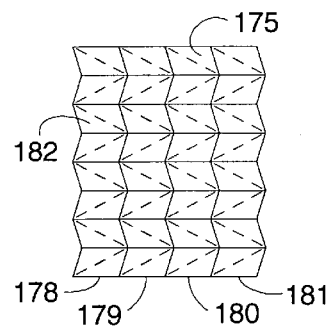
FIG. 17a shows a plan view of a closed cross section bellow derived from FIG. 16a which has all triangular panels.
Figure 17B:
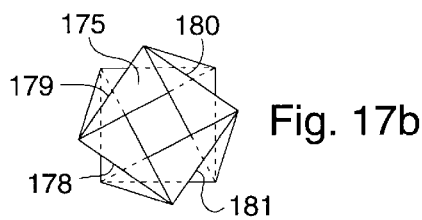

FIG. 17a shows a plan view and FIG. 17b shows a folded view of closed cross section bellow 175 with all triangular panels such as 182 derived from bellow embodiment 160 by setting the length of longitudinal inner fold lines such as 171 to zero. Edges 178, 179, 180, and 181 define a cross sectional profile of bellow 175. The advantage of this embodiment is that triangular panels such as 182 present at all locations increase the structural rigidity and thereby increases its ability to support a positive or negative pressure inside, and reduces its propensity to buckle when it is compressed and sag under its own weight. As a result, this embodiment is useful for protective applications that require a positive or negative pressure inside the bellow, for low cost pneumatic or hydraulic actuators, and for low cost displacement pumps.

FIG. 18a shows a plan view and FIG. 18b shows a folded view of closed cross section bellow 185 using several alternating minimal distortion double inversions with 90 degree initial wall angles such as 187. Bellow 185 uses successive double inversions such as 194 and 195 which point in alternating directions down. The advantage of the alternating fold design shown on bellow 185 is that it has a compressed length which is two thirds as long as the compressed length of the non alternating design shown on bellow 160, given the same amount of material and given fold lengths 174 and 199 are equal. As stated for open cross section bellows, a disadvantage of the alternating fold design is that double inversions such as 125 which are on top of the bellow could collect chips and other debris, which could eventually cause damage. Therefore, bellow 185 is most useful for applications which do not dump chips onto the bellow, such as for dust covers.

FIG. 19a shows a plan view and FIG. 19b shows a folded view of closed cross section bellow 200 with all triangular panels such as 207 derived from bellow 185 by setting the length of longitudinal inner fold lines such as 196 to zero. Edges 203, 204, 205, and 206 define a cross sectional profile of bellow 200. Like bellow 175, the advantage of bellow embodiment 200 is that triangular panels such as 207 present at all locations increases the structural rigidity of the bellow and thereby increases its ability to support a positive or negative pressure inside, and reduces its propensity to buckle when it is compressed and to sag under its own weight.

FIG. 20a shows a plan view, FIG. 20b shows a folded view, and FIG. 20c shows a side view of closed cross section bellow 210 with all triangular panels derived from bellow 200 by taking half of double inversion 213 and repeating it multiple times up and down the length of bellow 210. The resulting bellow can be used in a standard collapsing mode, or it can be used as a novel rotary seal, as is shown in FIG. 20c. When bottom end 216 is held stationary, top end 214 can be rotated over a limited angle range, about 90 degrees for the particular embodiment shown, without translating top end 214. When acting as a rotary seal, middle fold lines such as 215 translate up and down to accommodate the twisting.

FIG. 21a shows a plan view, FIG. 21b shows a folded view, and FIG. 21c shows a side view of closed cross section bellow 220 with all triangular panels which consists entirely of half double inversion folds. Bellow 220 has the unusual property that if bottom end 224 is fixed, when top end 223 is translated downward it is forced to twist as well. Bellow 220 could be used as a novel hand pump which can be twisted as it is pushed on, to provide extra collapsing force.

Figure 22A:
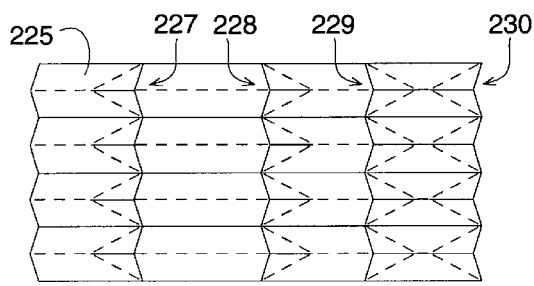
FIG. 22a shows a plan view of a closed cross section bellow derived from FIG. 16a which uses a different arrangement of the double inversions.
Figure 22B:
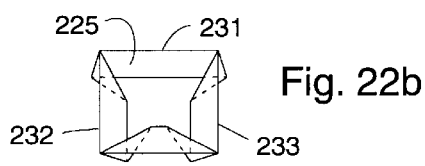

FIG. 22a shows a plan view and FIG. 22b shows a folded view of closed cross section bellow 225 with double inversions such as 227, 228, 229, and 230 which are arranged to allow free flow of chips and debris off of top 231 and off of sides 232 and 233.

Figure 23A:
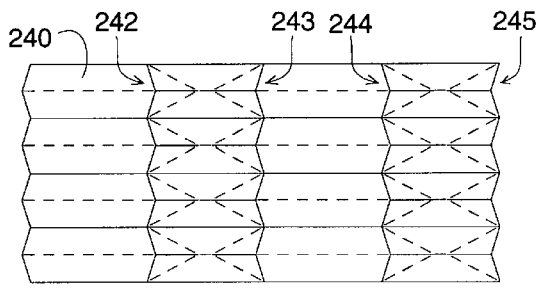
FIG. 23a shows a plan view of a closed cross section bellow derived from FIG. 16a which uses a different arrangement of the double inversions.
Figure 23B:
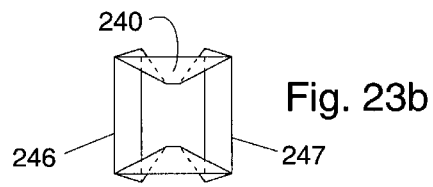

FIG. 23a shows a plan view and FIG. 23b shows a folded view of closed cross section bellow 240 with double inversions such as 242, 243, 244, and 245 which are arranged to allow parallel sides 246 and 247 to avoid obstacles.

Figure 24A:
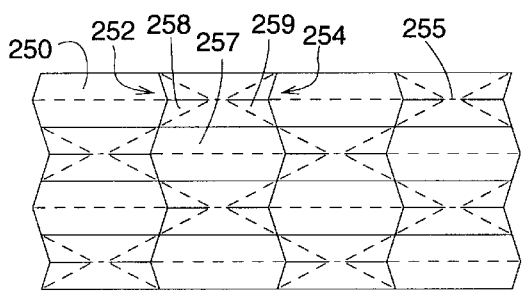
FIG. 24a shows a plan view of a closed cross section bellow derived from FIG. 18a which uses a different arrangement of alternating double inversions.
Figure 24B:
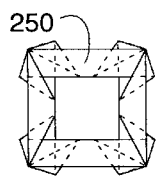

FIG. 24a shows a plan view and FIG. 24b shows a folded view of closed cross section bellow 250 with inward pointing double inversion pairs such as 252 and 254 which alternate direction down the length of bellow 250. As described earlier, the alternating pattern reduces the compressed length to two thirds of the compressed length of a non alternating design such as bellow 240. This alternating design is also somewhat stiffer and more able to support a differential pressure, because every trapezoidal panel such as 257 is supported by adjacent triangular panels such as 258 and 259.

Figure 25A:
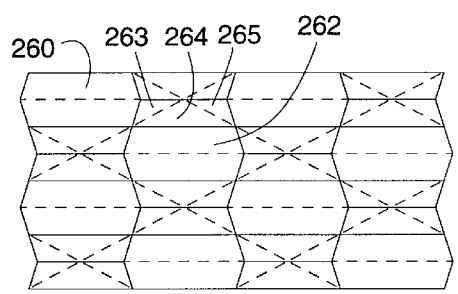
FIG. 25a shows a plan view of shows a closed cross section bellow derived from FIG. 24a which has more triangular panels.
Figure 25B:
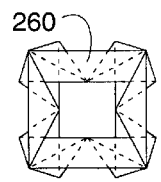

FIG. 25a shows a plan view and FIG. 25b shows a folded view of closed cross section bellow 260 derived from bellow 250 by setting the length of longitudinal inner fold segments such as 255 to zero. The result is an even stiffer design more able to support a differential pressure because every trapezoidal panel such as 262 is supported by three triangular panels such as 263, 264, and 265.

Figure 26A:
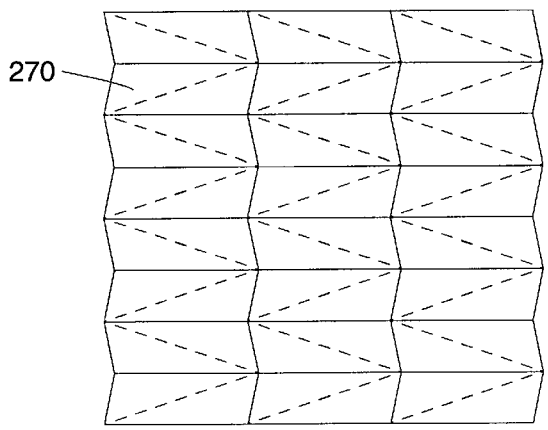
FIG. 26a shows a plan view of a bellow with a triangular cross section that has all triangular panels.
Figure 26B:
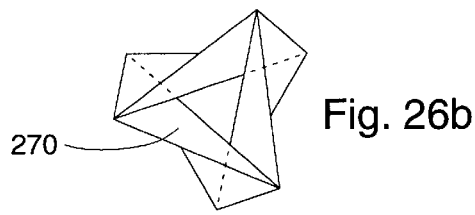

FIG. 26a shows a plan view and FIG. 26b shows a folded view of bellow 270 which has a triangular closed cross section with all triangular panels, which uses minimal distortion double inversion folds. The triangular design gives very high rigidity and therefore could be useful as a fluid actuator or a pump.

Figure 27A:
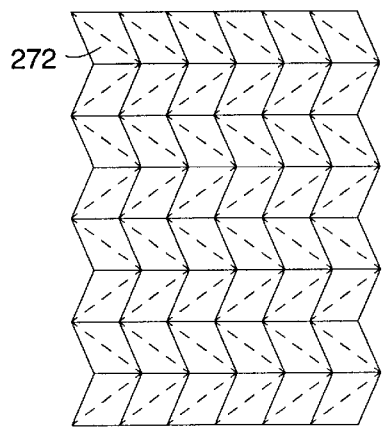
FIG. 27a shows a plan view of a bellow with a hexagonal cross section that has all triangular panels.
Figure 27B:
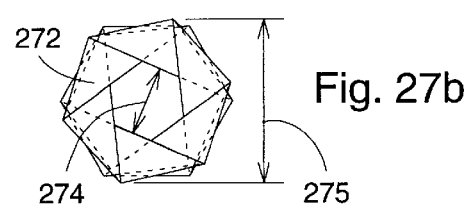

FIG. 27a shows a plan view and FIG. 27b shows a folded view of bellow 272 which has a hexagonal closed cross section with all triangular panels and has minimal distortion double inversion folds. This hexagonal embodiment is useful for protective covers, and for use as a hose that provides relatively low resistance to flow, because its effective inner diameter 274 is relatively large compared to its effective outer diameter 275. Like the other triangular embodiments, it is also useful for fluid actuators and pumps.

Figure 28A:
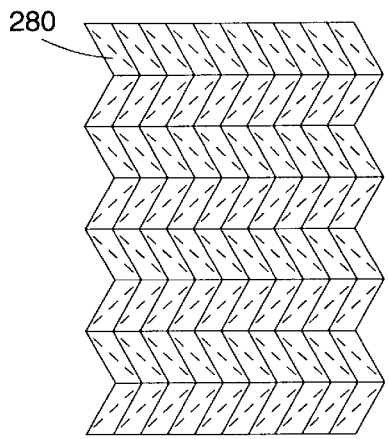
FIG. 28a shows a plan view of a bellow with a uniform ten sided closed cross section that has all triangular panels.
Figure 28B:
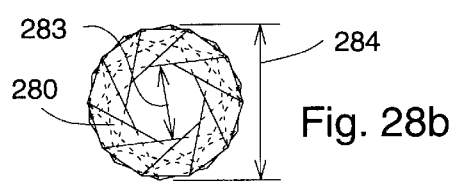

FIG. 28a shows a plan view and FIG. 28b shows a folded view of bellow 280 which has a uniform ten sided closed cross section with all triangular panels and has minimal distortion double inversion folds. Due to high structural rigidity, and a large inner diameter 283 compared to the outer diameter 284, bellow 280 is especially useful as a feather light collapsing hose for conveying air at relatively low pressures. Such a hose would be formed preferably from polypropylene film which is from 0.002 to 0.004 inches thick. One useful application for such a hose is to convey air to a respirator mask worn by a worker in a toxic environment with minimal discomfort to the wearer.

Figure 29A:
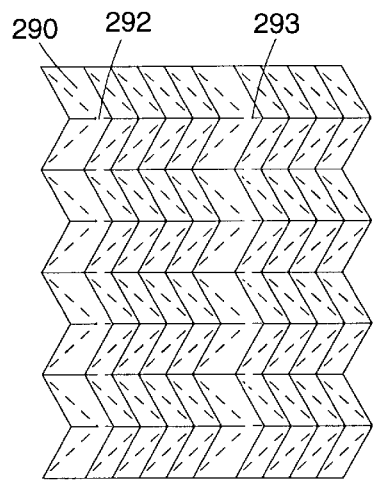
FIG. 29a shows a plan view of a bellow with non uniform ten sided closed cross section that has almost all triangular panels.
Figure 29B:
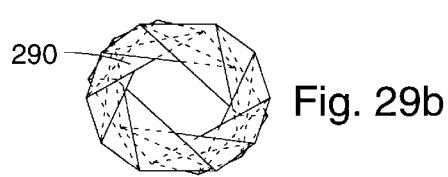

FIG. 29a shows a plan view and FIG. 29b shows a folded view of bellow 290 derived from bellow 280 by making longitudinal inner folds such 292 and 293 non zero in length. By making the longitudinal inner folds have non zero length the stiffness of bellow 290 can be reduced somewhat, thereby reducing the stress at some fold lines somewhat when the double inversion folds impose angular distortions.

Figure 30A:
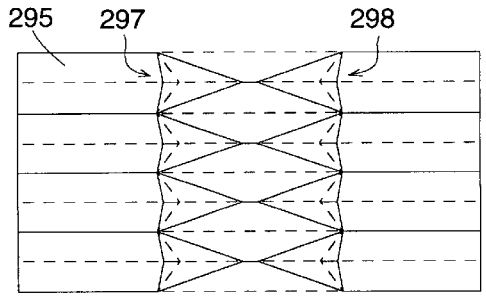
FIG. 30a shows a plan view of an open cross section bellow using inward pointing triple inversions that have a 90 degree initial wall angle.
Figure 30B:
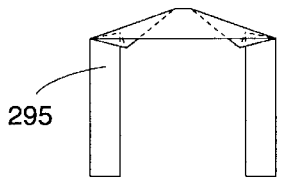

FIG. 30a shows a plan view and FIG. 30b shows a folded view of open cross section bellow 295 using several minimal distortion triple inversions which point toward each other, such as triple inversions 297 and 298. Unlike double inversions, triple inversions must point either towards or away from each other when they are connected, thus restricting the number of possible arrangements.

Figure 31A:
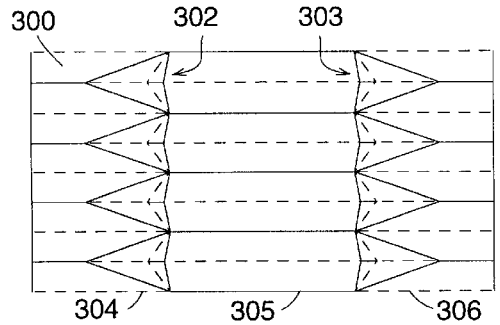
FIG. 31a shows a plan view of an open cross section bellow using outward pointing triple inversions that have a 90 degree initial wall angle.
Figure 31B:
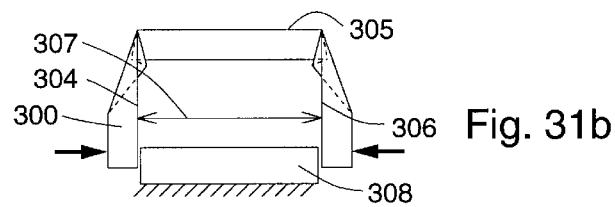

FIG. 31a shows a plan view and FIG. 31b shows a folded view of open cross section bellow 300 using several minimal distortion triple inversions which point away from each other, such as triple inversions 302 and 303. Edges 304, 305, and 306 define a cross sectional profile of bellow 300. Compared to double inversion bellows, bellow 300 has the unique advantage that distance 307 between edges 304 and 306 remains constant when bellow 300 is extended, thereby allowing barrier 308 to constrain bellow 300 laterally without slop. Since many machines already have a barrier similar to 308 in their design, bellow 300 could be constrained laterally without any added panels, thus lowering its cost.

Figure 32A:
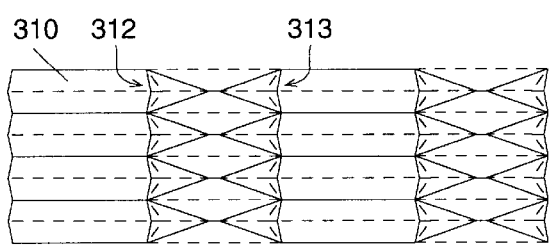
FIG. 32a shows a plan view of a bellow with a rectangular cross section using triple inversions.
Figure 32B:
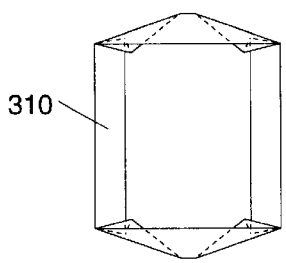

FIG. 32a shows a plan view and FIG. 32b shows a folded view of rectangular closed cross section bellow 310 using several minimal distortion triple inversions such as 312 and 313. For closed cross section bellows, a general design rule is that triple inversions, like single inversions, can only be used to make bellows that have an even number of walls.

Figure 33A:
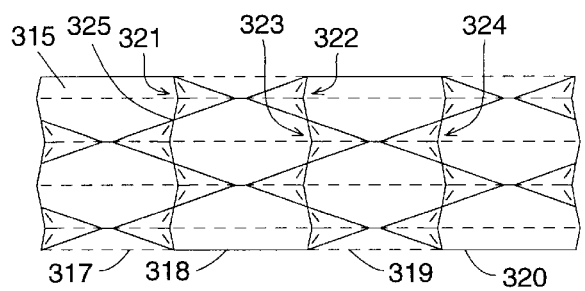
FIG. 33a shows a plan view of a bellow derived from FIG. 32a with alternating triple inversions.
Figure 33B:
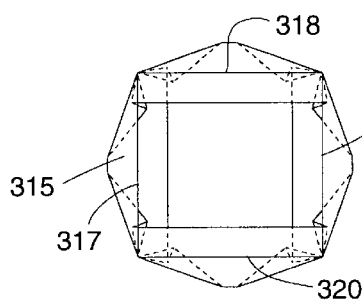

FIG. 33a shows a plan view and FIG. 33b shows a folded view of rectangular closed cross section bellow 315 derived from bellow 310 by alternating the direction each triple inversion points down the length of bellow 310. Alternating pairs of inversions, such as pair 321 with 322 and pair 323 with 324, eliminate some of the longitudinal fold lines which would normally pass through fold line intersections such as 325. Edges 317, 318, 319 and 320 define a cross section of bellow 315. The main advantage of the alternating triple inversion design is that the more distributed array of triangular panels make for a stiffer structure which is better able to support a differential pressure.

Figure 34A:
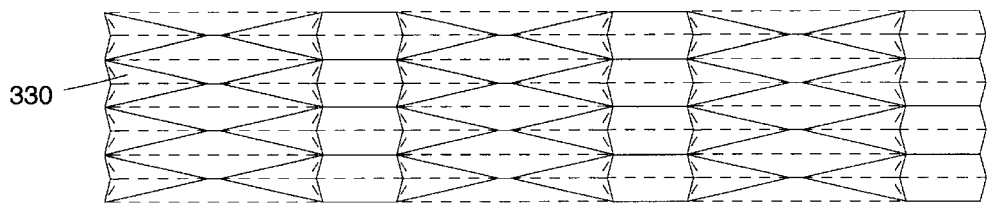
FIG. 34a shows a plan view of a bellow with a non uniform six sided cross section using triple inversions.
Figure 34B:
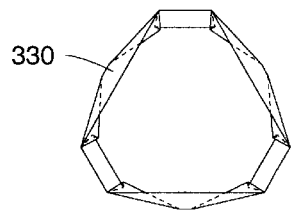
Figure 35A:
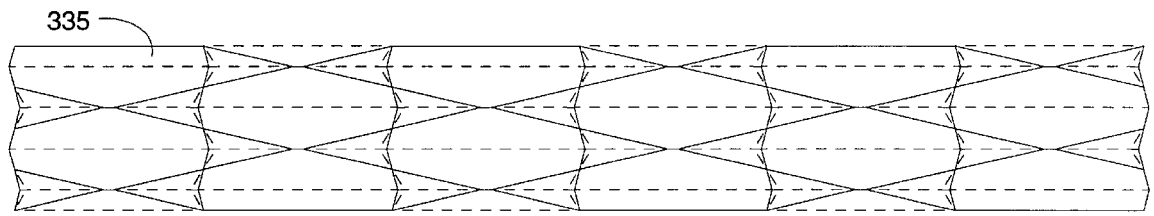
FIG. 35a shows a plan view of a bellow derived from FIG. 34a which uses alternating triple inversions.
Figure 35B:
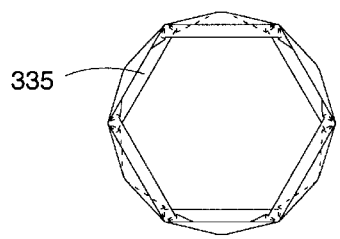

In the same vein as bellow 310, FIG. 34a shows a plan view and FIG. 34b shows a folded view of six sided closed cross section bellow 330 using several minimal distortion triple inversions. In the same vein as bellow 315, FIG. 35a shows a plan view and FIG. 35b shows a folded view of six sided closed cross section bellow 335 using several alternating minimal distortion triple inversions.

Figure 36A:
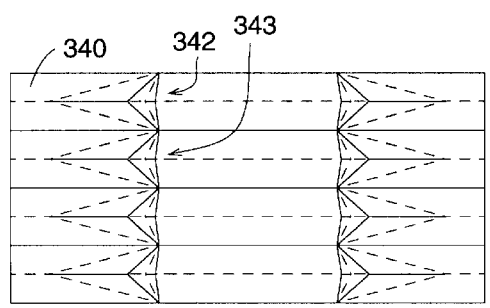
FIG. 36a shows a plan view of an open cross section bellow using quadruple inversions that have a 90 degree initial wall angle.
Figure 37A:
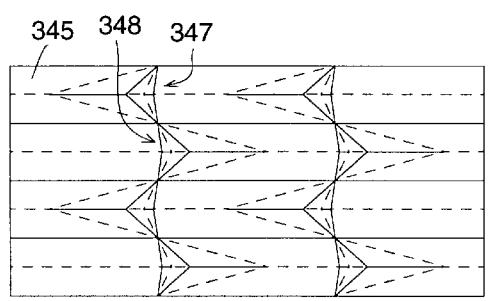
FIG. 37a shows a plan view of a bellow derived from FIG. 36a which uses alternating quadruple inversions.
Figure 36B:
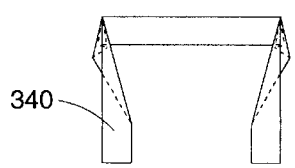
Figure 37B:
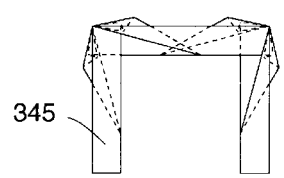
Figure 38A:
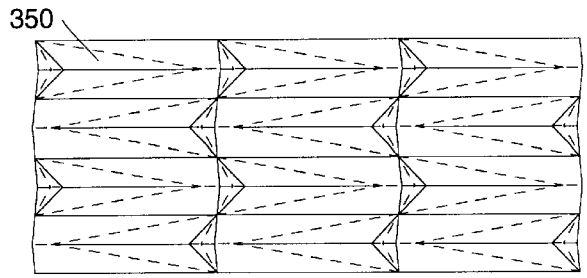
FIG. 38a shows a plan view of a bellow with a triangular cross section that uses quadruple inversions.
Figure 38B:
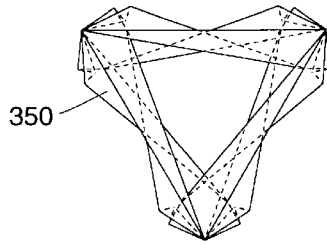

Quadruple inversion folds can be combined in the same ways as double inversion folds to achieve the same types of design objectives as was discussed for the double inversions. Analogous to bellow 10, FIG. 36a shows a plan view and FIG. 36b shows a folded view of open cross section bellow 340 which has quadruple inversions such as 342 and 343 which point in the same direction. Analogous to bellow 120, FIG. 37a shows a plan view and FIG. 37b shows a folded view of open cross section bellow 345 which has quadruple inversions such as 347 and 348 which point in opposite directions, to achieve a shorter compressed length. As examples of closed cross section bellows that use quadruple inversions, FIG. 38a shows a plan view and FIG. 38b shows a folded view of triangular cross section bellow 350 using quadruple inversions, FIG. 39a shows a plan view and FIG. 39b shows a folded view of square cross section bellow 355 using quadruple inversions, and FIG. 40a shows a plan view and FIG. 40b shows a folded view of hexagonal cross section bellow 360 using quadruple inversions.

As was discussed earlier, the bellow fold patterns of the present invention can be made by several manufacturing methods. If foldable plastics are used, bellows of the present invention can be made using vacuum forming, blow molding, injection molding, stamping, or other forming methods known to those skilled in the art of manufacturing plastic parts. Also, the bellow fold patterns of the present invention can be made using more traditional rubberized fabrics and rubbery materials, using manufacturing methods known to those skilled in the art of conventional bellows manufacturing.

Further modifications of the invention will also occur to persons skilled in the art, and all such are deemed to fall within the spirit and scope of the invention as defined in the appended claims.

What is claimed is:

1. A novel double inversion fold pattern which forms the corner of a bellow with an initial wall angle of $\beta_0^*$ degrees, consisting of a first inversion with design angle $\chi_1$ degrees and a second inversion with design angle $\chi_2$ degrees, where said angle $\chi_1$ is in the range $$90-\beta_0^*/4 < \chi_1 < 89$$

and where said design angle $\chi_2$ is determined by said design angle $\chi_1$ and said initial wall angle $\beta_0^*$ according to $$\chi_2 = \chi_1 - (90 - \beta_0^*/2)$$

whereby said double inversion fold pattern allows a bellow to extend the longest possible distance without kinking and hence damaging the bellow panels.

2. A novel double inversion fold pattern of claim 1 which forms the corner of a bellow with an initial wall angle of 90 degrees, consisting of a first inversion with design angle $\chi_1$ degrees and a second inversion with design angle $\chi_2$ degrees, where said design angle $\chi_1$ is in the range $$67.5 < \chi_1 < 89$$

and where said design angle $\chi_2$ is determined by said design angle $\chi_1$ according to $$\chi_2 = \chi_1 - 45$$

whereby said double inversion fold pattern allows a square bellow to extend the longest possible distance without kinking and hence damaging the bellow panels.

3. A novel double inversion fold pattern of claim 1 which forms the corner of a bellow with an initial wall angle of 108 degrees, consisting of a first inversion with design angle $\chi_1$ degrees and a second inversion with design angle $\chi_2$ degrees, where said design angle $\chi_1$ is in the range $$63 < \chi_1 < 89$$

and where said design angle $\chi_2$ is determined by said design angle $\chi_1$ according to $$\chi_2 = \chi_1 - 36$$

whereby said double inversion fold pattern allows a pentagonal bellow to extend the longest possible distance without kinking and hence damaging the bellow panels.

4. A novel double inversion fold pattern of claim 1 which forms the corner of a bellow with an initial wall angle of 120 degrees, consisting of a first inversion with design angle $\chi_1$ degrees and a second inversion with design angle $\chi_2$ degrees, where said design angle $\chi_1$ is in the range $$60 < \chi_1 < 89$$

and where said design angle $\chi_2$ is determined by said design angle $\chi_1$ according to $$\chi_2 = \chi_1 - 30$$

whereby said double inversion fold pattern allows a hexagonal bellow to extend the longest possible distance without kinking and hence damaging the bellow panels.

5. A novel bellow comprising a stack of oppositely pointing double inversion fold patterns of claim 1, whereby the compressed height to extended height ratio of said bellow is minimized.

6. A novel closed cross section bellow with all triangular panels comprising a stack of abutted double inversion fold patterns of claim 1, whereby said bellow can extend the longest possible distance without kinking and hence damaging said bellow panels.

* * * * *